United States Patent [19]
Kobayashi et al.

[11] Patent Number: 5,972,240
[45] Date of Patent: *Oct. 26, 1999

[54] LIQUID CRYSTAL COMPOSITE MATERIAL AND LIQUID CRYSTAL DISPLAY DEVICE(S) WHICH USE THEM

[75] Inventors: Hidekazu Kobayashi; Shuhei Yamada; Eiji Chino; Masayuki Yazaki; Hidehito Iisaka; Yutaka Tsuchiya, all of Nagano-ken, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/617,898

[22] PCT Filed: Jul. 17, 1995

[86] PCT No.: PCT/JP95/01417

§ 371 Date: Mar. 15, 1996

§ 102(e) Date: Mar. 15, 1996

[87] PCT Pub. No.: WO96/02610

PCT Pub. Date: Feb. 1, 1996

[30] Foreign Application Priority Data

| Jul. 15, 1994 | [JP] | Japan | 6-163811 |
| Aug. 4, 1994 | [JP] | Japan | 6-183527 |
| Feb. 21, 1995 | [JP] | Japan | 7-032711 |

[51] Int. Cl.[6] .......... C09K 19/52; C09K 19/12; C09K 19/38
[52] U.S. Cl. .......... 252/299.01; 252/299.61; 252/299.63; 252/299.64; 252/299.65; 252/299.66; 252/299.67; 349/183
[58] Field of Search .......... 252/299.01, 299.61, 252/299.63, 299.64, 299.65, 299.66, 299.67; 349/183, 10, 86

[56] References Cited

U.S. PATENT DOCUMENTS

| 4,551,264 | 11/1985 | Eidenschink et al. . |
| 4,994,204 | 2/1991 | Doane et al. . |
| 5,061,400 | 10/1991 | Obikawa . |
| 5,344,587 | 9/1994 | Coates et al. . |
| 5,374,371 | 12/1994 | Takeuchi et al. . |

FOREIGN PATENT DOCUMENTS

| 460 436 | 12/1991 | European Pat. Off. . |
| 564 869 | 10/1993 | European Pat. Off. . |
| 53-38371 | 4/1978 | Japan . |
| 54-94940 | 7/1979 | Japan . |
| 58-501631 | 9/1983 | Japan . |
| 63-106725 | 5/1988 | Japan . |
| A-2-86693 | 3/1990 | Japan . |
| A-2-237949 | 9/1990 | Japan . |
| A-2-502834 | 9/1990 | Japan . |
| A-4-502781 | 5/1992 | Japan . |
| A-4-159258 | 6/1992 | Japan . |
| 4-227684 | 8/1992 | Japan . |
| A-4-290859 | 10/1992 | Japan . |
| A-5-502260 | 4/1993 | Japan . |
| 5-119302 | 5/1993 | Japan . |
| A-5-119304 | 5/1993 | Japan . |
| A-5-224191 | 9/1993 | Japan . |
| A-5-281524 | 10/1993 | Japan . |
| A-5-289064 | 11/1993 | Japan . |
| A-6-25667 | 2/1994 | Japan . |
| 89/12621 | 12/1989 | WIPO . |

OTHER PUBLICATIONS

A. Boller et al., "Synthesis and some Physical Properties of Phenylpyrimidines", *Mol. Cryst. Liq. Cryst.*, 1977, vol. 42, pp. 215–231.

L. A. Karamysheva et al., "New Heterocyclic Liquid Crystalline Compounds", *Mol. Cryst. Liq. Cryst.*, 1981, vol. 67, pp. 241–252.

*Die Angewandte Chemie*, vol. 89, p. 103 (1977).
CA 113 :41443, 1990.
CA 100: 157225, 1983.
CA 121: 281327, 1993.
CA 121:242448, 1994.
CA 120: 77738, 1992.
CA 118: 113692, 1992.

*Primary Examiner*—Shean G. Wu
*Attorney, Agent, or Firm*—Oliff & Berridge, PLC

[57] ABSTRACT

Liquid crystal composite materials containing organic compounds enable the lowering of the drive voltage of liquid crystal display devices and of liquid crystal display devices of a polymer-dispersion type. The liquid crystal composite materials can be used in liquid crystal display devices and PDLC devices with a scattering layer having a liquid crystal and a polymer between the electrodes. A ter phenyl derivative can also favorably be used in the liquid crystal composite materials and in the liquid crystal display devices.

12 Claims, 13 Drawing Sheets

LIQUID CRYSTAL COMPOSITE MATERIAL AND LIQUID CRYSTAL DISPLAY DEVICE(S) WHICH USE THEM

This application is a 371 of PCT/JP95/01417 filed Jul. 17, 1995.

BACKGROUND OF THE INVENTION

1. Field of the Invention

The present invention relates to a liquid crystal composite material, a liquid crystal display device using this liquid crystal composite material, and a new ter phenyl derivative which can be used favorably in the liquid crystal composite material.

2. Description of Related Art

A liquid crystal display device is a device which uses the electrooptical effects of liquid crystals. The liquid crystal phases used therein include the nematic phase, the cholesteric phase and the smectic phase. At present, the most widely used display methods are the twisted nematic form (hereafter called TN) which uses the nematic phase, or the super twisted nematic form (hereafter called STN) which further enlarges the twisting angle. In large-capacity displays, active matrix displays in which switching devices are placed at each pixel electrode are used. The switching devices are matrix driven and switching of the respective pixel electrodes is conducted through the switching devices. Liquid crystal display devices offer the following advantages:

1. The unit can be made small and thin;
2. The drive voltage is low, as is power consumption; and
3. The user's eyes do not tire even after a long period of usage because the displays are light-receiving devices.

Because of these advantages, liquid crystal display devices have been applied to wristwatches, electronic calculators, audio equipment, various measuring instruments and the dashboards of automobiles and the like. More recently, these devices have been applied to displays for personal computers and word processors and to color televisions and other displays with extremely large numbers of pixels, and are viewed as substitutes for CRTs. Thus, liquid crystal display devices are being applied to a wide range of fields, and the range of applications will likely continue to expand in the future. It is probable that the properties required of liquid crystal materials will also change accompanying this expansion, with the properties listed below serving as concrete examples.

1. Having no coloration, and being stable thermally, electrically, optically and chemically.
2. Having a wide range of practical use temperatures.
3. Having fast electrooptical response speed.
4. Having low drive voltages.
5. Having rapid start-up of voltage-optical transmittance properties, with the temperature dependence of the threshold voltage (hereafter called $V_{th}$) being small.
6. Having a wide range of visual angles.

Of these properties, numerous liquid crystals are known which satisfy property 1, but liquid crystal compounds with simple components satisfying properties 2 through 6 are not known. In order to satisfy these properties, numerous liquid crystal composite materials are used wherein nematic liquid crystal compounds or non-liquid crystal compounds are mixed. Because liquid crystal display devices are used in wristwatches, electric calculators and personal computer and word processor displays, a low drive voltage is particularly sought from among these properties.

In addition to analog watches which use needles and digital watches which are equipped with liquid crystal display devices, recent watches have been developed which are hybrid watches having small liquid crystal windows because of the diversified information that is to be displayed, as well as bi-layer watches in which a liquid crystal display device overlaps the surface of an analog watch using a needle (for example, see Japanese Laid-Open Patent Publication Sho 54-94940). In the field of clocks and electronic notebooks, multi-functional devices are being developed which have various functions. For these kinds of applications, the development of a display device which is transparent and bright in a non-magnetic field is anticipated. Accompanying these kinds of applications, reflective-type display devices which are bright and do not use polarizing plates are being developed. For example, a mode which is transparent in an impressed electric field and dispersed under no impressed electric field (abbreviated PDLC; see Japanese Laid-Open Patent Publication Sho 58-501631) and devices which are dispersed under an impressed electric field and either absorb light or are transparent under no impressed electric field (abbreviated reverse PDLC; in Japanese Laid-Open Patent Publication Hei 4-227684 as gel network form, in Japanese Laid-Open Patent Publication 5-119302 as the granule orientation dispersion form; and in U.S. Pat. No. 4,994,204 as the liquid crystal droplet dispersion form) have been developed.

In information equipment fields including wristwatches, the trend has been toward making devices smaller and portable, and display devices for mounting on these devices are being sought which have low power consumption. These types of portable information display equipment and information processing equipment generally require batteries making longevity of the battery when using the devices an extremely important topic. Consequently, devices have been developed which include solar cells. For example, in Japanese Laid-Open Patent Publication Sho 53-38371, the aim is to conserve space by combining a liquid crystal display device and a solar cell. In Japanese Laid-Open Patent Publication Sho 63-106725, an example is provided with a solar cell placed near a liquid crystal display device and wherein the display device is used in which the liquid crystal is dispersed. Regardless of whether the device uses a solar cell or is driven by a battery, display devices with low power consumption are required.

Conventional liquid crystal display devices of the type having bright polymer-dispersion without using light-scattering boards (hereafter, abbreviated PDLC) have the problem that the drive voltage is high. When PDLC was first developed, the drive voltage was several dozen volts. At present, the drive voltage has dropped below 10 V, but even then 5 V is necessary, making a PDLC with as small a drive voltage as possible desirable.

Accordingly, it is an objective of the present invention to provide 1) a liquid crystal composite material with which the drive voltage of liquid crystal display devices and of liquid crystal display devices of polymer-dispersion type can be lowered; 2) liquid crystal display devices and polymer-dispersion type liquid crystal display devices in which the drive voltage has been lowered; and 3) new compounds which can be used favorably in these kinds of liquid crystal display devices.

SUMMARY OF THE INVENTION

With the present invention, a liquid crystal composite material is provided which contains compounds represented by the general formula

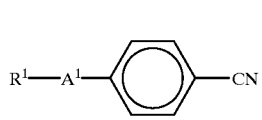

(1)

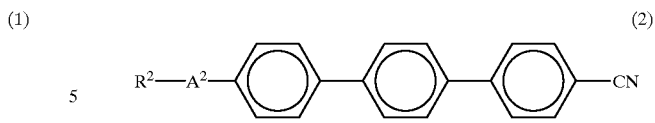

(2)

wherein at least one hydrogen atom out of $R^1$, $A^1$, and the hydrogen atoms in the benzene ring is displaced by a halogen atom, $R^1$ represents an alkyl radical or an alkoxy radical, and $A^1$ is selected from a group comprising a benzene ring, a cyclohexane ring, one of the following structures:

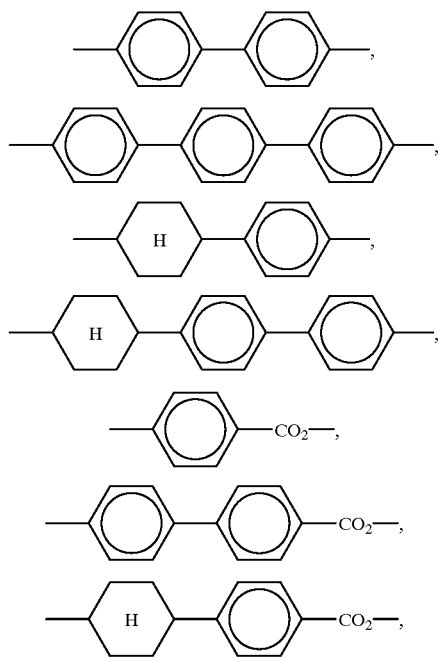

a pyridine ring and a pyrimidine ring. Using this liquid crystal composite material, a liquid crystal display device and a PDLC display device with a light-scattering layer having a liquid crystal and a polymer between the electrodes are also provided.

In a liquid crystal display device of the polymer-dispersion type with a light-scattering layer containing a liquid crystal and a polymer provided between the electrodes, light-scattering is conducted using the difference in refraction index between the liquid crystal and the polymer.

By causing the compounds of formula (1) to be contained in the liquid crystal composite material, it is possible to make a liquid crystal display device using this liquid crystal composite material have lower drive voltage. It is also possible to make a polymer-dispersion type of liquid crystal display device using this liquid crystal composite material to have lower drive voltage.

The aforementioned halogen atom is preferably a fluorine atom. When a fluorine atom is used, $\Delta\epsilon$ (the non-isotropy of the dielectric constant) becomes larger, the viscosity becomes lower, and a low drive voltage becomes possible.

In addition, with the present invention, a liquid crystal composite material is provided which contains compounds represented by the general formula wherein at least one of the hydrogen atoms is displaced by a fluorine atom, $R^2$ represents an alkyl radical or an alkoxy radical, and $A^2$ represents a cyclohexane ring or a benzene ring. Using this liquid crystal composite material, a liquid crystal display device and a PDLC display device with a light-scattering layer having a liquid crystal and a polymer between the electrodes are also provided.

By causing compounds of formula (2) to be contained in the liquid crystal composite material, it is possible to make a liquid crystal display device using this liquid crystal composite material have lower drive voltage. It is also possible to make a polymer-dispersion type of liquid crystal display device using this liquid crystal composite material to have lower drive voltage.

In the compounds of formula (2) above, it is preferable for at least one of the hydrogen atoms in the three benzene rings on the cyano radical side to be displaced by a fluorine atom. It is further preferable for at least one out of the hydrogen atoms of the ortho position with respect to the cyano radical, out of the hydrogen atoms in the benzene ring bonded directly to the cyano radical, to be displaced by the fluorine atom, so that a more stable compound is formed.

In addition, with the present invention, a liquid crystal composite material is provided which contains compounds represented by the general formula

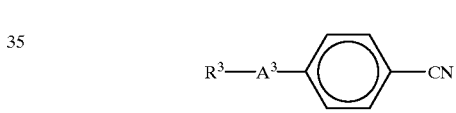

(3)

wherein at least one of the hydrogen atoms is displaced by a fluorine atom, $R^3$ represents an alkyl radical or an alkoxy radical, and $A^3$ represents a pyridine ring, a pyrimidine ring, a cyclohexane ring or a benzene ring. Using this liquid crystal composite material, a liquid crystal display device and a PDLC display device with a light-scattering layer having a liquid crystal and a polymer between the electrodes are also provided.

By causing the compounds of formula (3) to be contained in the liquid crystal composite material, it is possible to make a liquid crystal display device using this liquid crystal composite material have lower drive voltage. It is also possible to make a polymer-dispersion type of liquid crystal display device using this liquid crystal composite material to have lower drive voltage.

In addition, with the present invention, a liquid crystal composite material is provided which contains compounds represented by the general formula

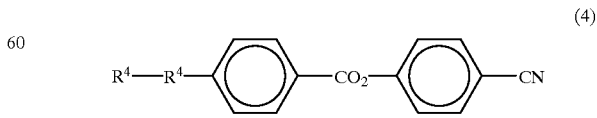

(4)

wherein at least one of the hydrogen atoms is displaced by a fluorine atom, $R^4$ represents an alkyl radical or an alkoxy radical, and either $A^4$ does not exist and the $R^4$ radical is directly bonded to the benzene ring on the right side, or $A^4$ represents a cyclohexane ring or a benzene ring. Using this liquid crystal composite material, a liquid crystal display device and a PDLC display device with a light-scattering layer having a liquid crystal and a polymer between the electrodes are also provided.

By causing the compounds of formula (4) to be contained in the liquid crystal composite material, it is possible to make a liquid crystal display device using this liquid crystal composite material have lower drive voltage. It is also possible to make a polymer-dispersion type of liquid crystal display device using this liquid crystal composite material to have lower drive voltage.

In the compounds of formula (4) above, it is preferable for at least one of the hydrogen atoms of the ortho position with respect to the cyano radical, out of the hydrogen atoms in the benzene ring bonded directly to the cyano radical, to be displaced by a fluorine atom. The drive voltage can thus be reduced.

In addition, with the present invention, a liquid crystal composite material is provided which contains the compounds of formulas (2), (3) and (4) above. Using this liquid crystal composite material, a liquid crystal display device and a PDLC display device with a light-scattering layer having a liquid crystal and a polymer between the electrodes are also provided.

In addition, with the present invention, a liquid crystal composite material is provided which contains the compounds of formulas (2) and (4) above. Using this liquid crystal composite material, a liquid crystal display device and a PDLC display device with a light-scattering layer having a liquid crystal and a polymer between the electrodes are also provided.

By causing the compounds of formulas (2), (3) and (4) to be contained in the liquid crystal composite material, or by causing the compounds of formula (2) and (4) to be contained in the liquid crystal composite material, it is possible to lower the drive voltage of the liquid crystal display device which uses this liquid crystal composite material. It is also possible to lower the drive voltage of a liquid crystal display device of polymer-dispersion type which uses this liquid crystal composite material. Moreover, a liquid crystal composite material is obtained in which the nematic phase-isotropic phase transition point (hereafter abbreviated as the N-I point) is high and the double refraction index is large.

In conventional PDLC, the problem exists that the drive voltage is generally too high. Although there are some liquid crystal composite materials used as the PDLC that have a drive voltage of around 3 V, the N-I point is less than 60° C. A liquid crystal composite material having a high N-I point while also having low drive voltage had not been developed. If the above-described liquid crystal composite material containing the compounds of formulas (2), (3) and (4) or the liquid crystal composite material containing the compounds of formula (2) and (4) is used, the N-I point is high; heat-resistance of around 70 to 80° C. can be secured; and it becomes possible to leave a liquid crystal display device using this liquid crystal composite material in an automobile or the like.

Because the N-I point is high, the double refraction index becomes high and the dependence of the double refraction index on temperature becomes small within the usage temperature range. Thus, it is difficult for the display state to be influenced by the usage temperature.

Accordingly if this liquid crystal composite material is used, a PDLC is obtained which has low drive voltage, fast response speed, is bright and has good contrast, and in which the dependence of these properties on temperature is small.

In the compounds of formula (2), when $A^2$ is a benzene ring, the non-isotropy of the double refraction index becomes extremely large, and the dispersion becomes large when this is used as a display device. Composition of the compound is easy. Furthermore, reliability in the weather and reliability in the state in which electric current is supplied are excellent. When $A^2$ is cyclohexane, the drive voltage is lower than when $A^2$ is a benzene ring. In addition, in the compounds of formula (2), it is preferable for at least one of the hydrogen atoms in the three benzene rings to the cyano radical side to be displaced by a fluorine atom. When one of the hydrogen atoms is displaced by a fluorine atom, it is preferable for thee fluorine atom to be at the ortho position of the CN radical. Furthermore, when another ortho position of the CN radical is displaced by one more fluorine atom, it is possible to produce a liquid crystal composite material having extremely low drive voltage. As $R^2$, it is preferable to use a propyl radical, a butyl radical or a pentyl radical.

In the compounds of formula (3), when $A^3$ is a benzene ring, the non-isotropy of the double refraction index ($\Delta n$) becomes large. In addition, the dispersion becomes large when the compounds of formula (3) when $A^3$ is a benzene ring are used as a display device. When $A^3$ is a cyclohexane ring, the viscosity of the compound is lowered, and the response speed becomes faster. When $A^3$ is a pyridine ring or a pyrimidine ring, it is possible to lower the drive voltage. When one of the hydrogen atoms is displaced by a fluorine atom, it is preferable for the fluorine atom to be at the ortho position of the CN radical. When another ortho position of the CN radical is displaced by one more fluorine atom, it is possible to produce a liquid crystal composite material with extremely low drive voltage. As $R^3$, it is preferable to use an ethyl radical, a propyl radical, a butyl radical, a pentyl radical or a hexyl radical.

In the compounds of formula (4), when $A^4$ does not exist and the $R^4$ radical is directly bonded to the benzene ring to the right, it is possible to effectively lower the drive voltage. When $A^4$ is a benzene ring, it is possible to boost the N-I point, thus, An becomes large and the dispersion becomes large in the case of use as a display device. When $A^4$ is a cyclohexane ring, it is possible to boost the N-I point. In addition, compatibility is good. When one of the hydrogen atoms is displaced by a fluorine atom, it is preferable for the fluorine atom to be at the ortho position of the CN radical. When another ortho position is displaced by one more fluorine atom, it is possible to produce a liquid crystal composite material with an extremely low drive voltage. As $R^4$, it is preferable to use a propyl radical, a butyl radical or a pentyl radical.

In addition, with the present invention, a liquid crystal composite material is provided which contains compounds represented by the general formula (5)

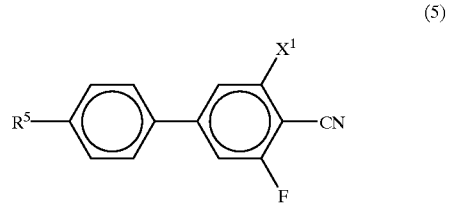

wherein $R^5$ represents an alkoxy radical or a normal chain alkyl radical with 1–10 carbons and $X^1$ represents a hydrogen atom or a fluorine atom. Using this liquid crystal composite material, a liquid crystal display device and a PDLC display device with a light-scattering layer having a liquid crystal and a polymer between the electrodes are also provided.

Furthermore, with the present invention, a liquid crystal composite material is provided which contains compounds represented by the general formula

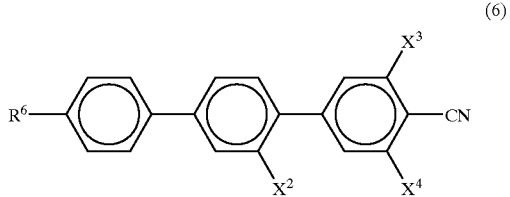

(6)

wherein $R^6$ represents an alkoxy radical or a normal chain alkyl radical with 1–10 carbons, $X^2$, $X^3$, and $X^4$ all represent either hydrogen atoms or fluorine atoms, and at least one of $X^2$, $X^3$, and $X^4$ is a fluorine atom. Using this liquid crystal composite material, a liquid crystal display device and a PDLC display device with a light-scattering layer having a liquid crystal and a polymer between the electrodes are also provided.

In addition, with the present invention, a liquid crystal composite material is provided which contains the compounds of formulas (5) and (6) above. Using this liquid crystal composite material, a liquid crystal display device and a PDLC display device with a light-scattering layer having a liquid crystal and a polymer between the electrodes are also provided.

In addition, with the present invention, a ter phenyl derivative is provided which is represented by the general formula

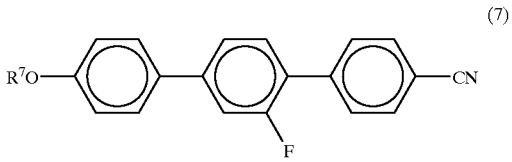

(7)

wherein $R^7$ represents a normal chain alkyl radical with 1–10 carbons. This ter phenyl derivative is favorably used in a liquid crystal composite material.

Furthermore, with the present invention, a liquid crystal composite material is provided which contains compounds represented by the general formula

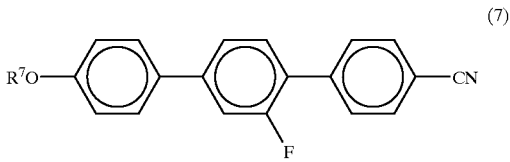

(7)

wherein $R^7$ represents a normal chain alkyl radical with 1–10 carbons. Using this liquid crystal composite material, a liquid crystal display device and a PDLC display device with a light-scattering layer having a liquid crystal and a polymer between the electrodes are also provided.

In order to widen the practical use temperature range of the liquid crystal display device, a liquid crystal compound which has a low crystallizing phase-nematic liquid crystal phase transition point (hereafter called the C-N point) and a high nematic phase-isotropic liquid transition point (N-I point) is necessary. In order to lower the drive voltage, it is necessary to lower the threshold voltage ($V_{th}$). The following relationship exists among $V_{th}$, the elasticity constant (hereafter called K) and the non-isotropy of the dielectric constant (hereafter called $\Delta\epsilon$).

$$V_{th} \propto \sqrt{\frac{K}{\Delta\epsilon}}$$

In order to lower $V_{th}$, a liquid crystal compound in which $\Delta\epsilon$ is large and K is small is needed. In general, the larger the molecular weight of the liquid crystal compound, the higher the N-I point and the smaller $\Delta\epsilon$. Conversely, the smaller the molecular weight of the liquid crystal compound, the lower the N-I point and the larger $\Delta\epsilon$. Until now, no liquid crystal compound has existed in which the N-I point is high and the drive voltage is low. Liquid crystal composite materials which combine liquid crystal compounds having a high N-I point and liquid crystal compounds having a low drive voltage have been used. With these liquid crystal composite materials, it is impossible to sufficiently promote each of these properties. There is a limit to conducting low voltage driving while maintaining a certain practical use temperature range because liquid crystal compounds having a high N-I point tend to raise the drive voltage of the liquid crystal composite material into which these compounds are mixed, and liquid crystal compounds having a low drive voltage tend to lower the N-I point of the liquid crystal composite material into which these compounds are mixed.

In contrast, the compounds of formula (5), which are mixed into a liquid crystal composite material in order to realize low voltage driving, have a much larger $\Delta\epsilon$ in comparison to conventional compounds having the same purpose. Consequently, a smaller quantity is needed to realize the same lowering of voltage, so that lowering of the drive voltage can be realized while lowering the N-I point of the original liquid crystal composite material only slightly.

On the other hand, the compounds of formula (6) have a high N-I point and are mixed into a liquid crystal composite material in order to obtain a liquid crystal composite material with a wide practical use temperature range. Conventional liquid crystal compounds with high N-I points have small $\Delta\epsilon$, thus the drive voltage of the original liquid crystal composite material was greatly increased when conventional liquid crystal compounds were added. In contrast, the compounds of formula (6) have a large $\Delta\epsilon$ notwithstanding the high N-I point. Therefore, it is possible to obtain a liquid crystal composite material with a wide practical use temperature range without raising the drive voltage of the original liquid crystal composite material very much.

It is preferable for a liquid crystal composite material to contain both the compounds of formula (5) and of formula (6). By so doing, it is possible to obtain a liquid crystal composite material with a low drive voltage, a wide practical use temperature range, and to obtain a liquid crystal display device with superior properties.

When the compounds of formulas (5) and (6) are both contained in the liquid crystal composite material, it is preferable for the compounds of formula (5) to be 1–20% by weight of the entire liquid crystal composite material, and it is preferable for the compounds of formula (6) to be 1–20% by weight of the entire liquid crystal composite material.

By causing the compounds of formula (7) to be contained in the liquid crystal composite material, it is possible to obtain a liquid crystal composite material with a wide practical use temperature range and a low drive voltage.

Liquid crystal display devices using a liquid crystal composite material containing the compounds of formula (5); the compounds of formula (6); the compounds of formulas (5) and (6); or the compounds of formula (7) are suitable for liquid crystal display devices using the time partitioning drive method. In particular, high time partition driving is possible in liquid crystal display devices of TN type and of STN type.

In addition, liquid crystal composite materials containing the compounds of formula (5); the compounds of formula (6); the compounds of formulas (5) and (6); or the compounds of formula (7), can be used suitably in PDLC, thereby providing liquid crystal display devices having wide practical use temperature ranges, low drive voltages and excellent display quality.

The method of producing the compounds of formula (2) is noted in Japanese Laid-Open Patent Publication Hei 4-290859. The method of producing the compounds of formula (3) is noted in Molecular Crystal and Liquid Crystal Vol. 42, P. 1225 (1977), P. 241 (1981), and in Die Angewandte Chemie Vol. 89, P. 103 (1977). The method of producing the compounds of formula (4) is noted in De-OS 2415929 (1974).

The methods of producing the compounds of formulas (5) and (6) are noted in U.S. Pat. No. 4,551,264 and Japanese Laid-Open Patent Publication Hei 3-505093, respectively.

The compounds of formula (7) can be obtained through a production method having the following procedures:

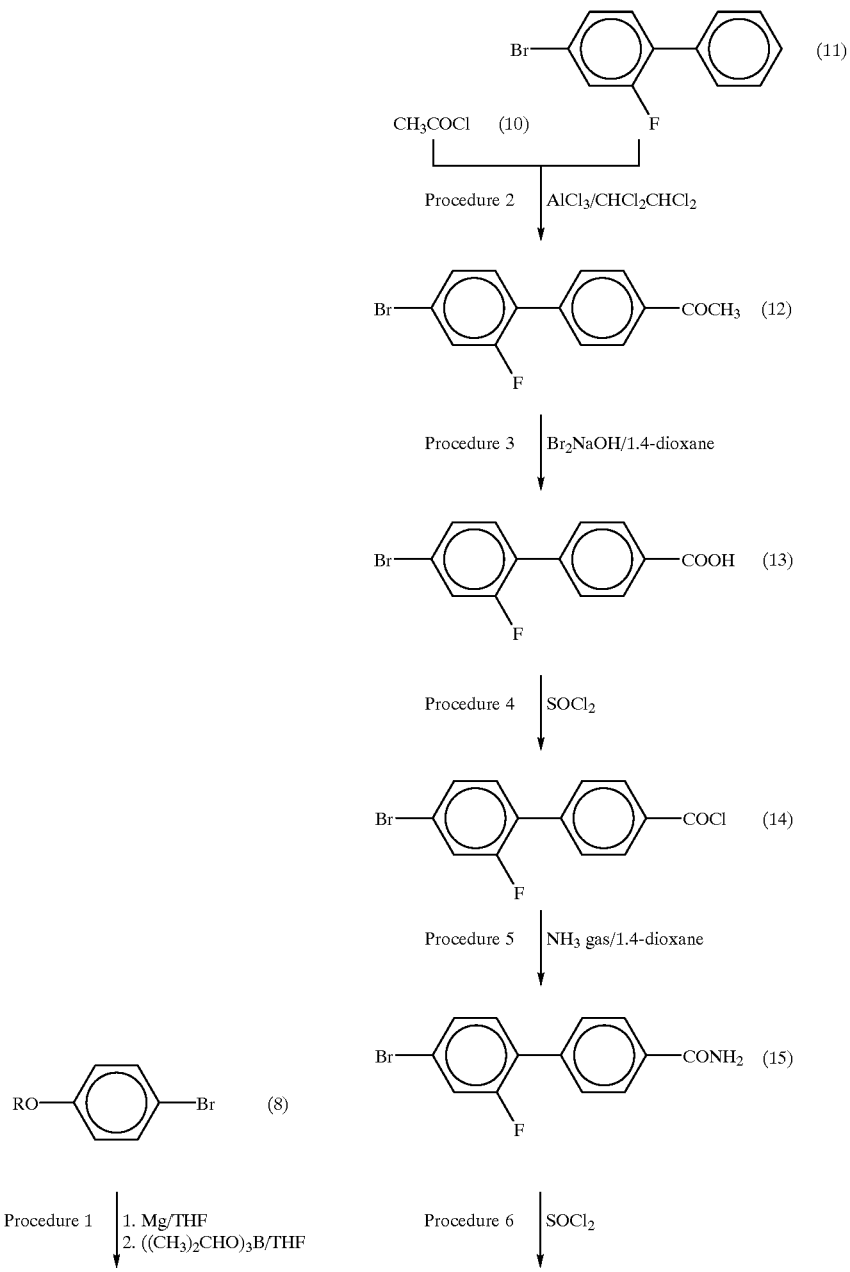

-continued

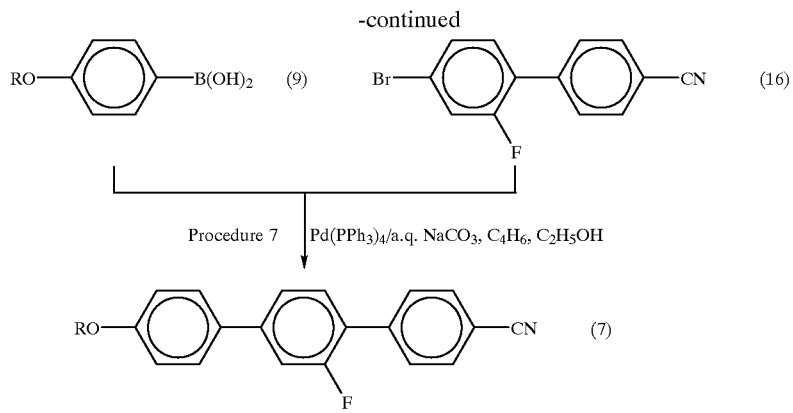

Procedure 1:

Compound (9) is obtained by making compound (8) a Grignard reagent in tetrahydrofuran, and causing this to react with triisopropyl borate.

Procedure 2:

Compound (12) is obtained by causing compound (10) and compound (11) to react in the presence of aluminum chloride in 1,2,2,2-tetrachloroethane.

Procedure 3:

Compound (13) is obtained by causing compound (12) to react with bromine and sodium hydroxide in 1,4-dioxane.

Procedure 4:

Compound (14) is obtained by causing compound (13) to react with thionyl chloride.

Procedure 5:

Compound (15) is obtained by causing compound (14) to react with ammonia gas in 1,4-dioxane.

Procedure 6:

Compound (16) is obtained by causing compound (15) to react with thionyl chloride.

Procedure 7:

The compound of formula (7) is obtained by causing compound (9) and compound (16) to react in a mixed solvent of ethanol and benzene in the presence of tetrakis (triphenylphospine) palladium.

The compounds shown below can be considered as examples of other components which are mixed with the compounds of formulas (1) through (7) to comprise liquid crystal composite materials. This is intended to be illustrative and not limiting, for it is possible to comprise liquid crystal composite materials by mixing all of the conventional liquid crystal compounds or compounds similar thereto with the compounds of formulas (1) through (7).

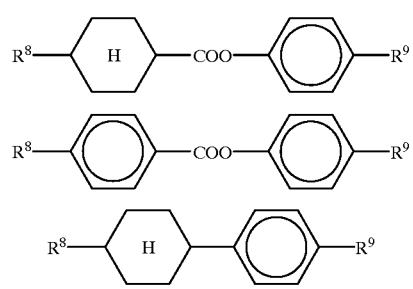

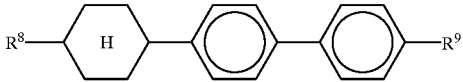

wherein $R^8$ and $R^9$ represent alkyl groups, alkoxy groups, alkoxymethylene groups, nitryl groups, fluoro groups or chloro groups, and the phenyl groups may have halogen displaced groups in 2 or 3 positions, while the cyclohexane ring is Trans-conformation.

In particular, the compounds of formulas (5) through (7) have good compatibility with all other liquid crystal compounds and compounds similar thereto, starting with the above-described compounds, and the liquid crystal composite materials that are obtained have wide practical use temperature ranges and low threshold voltages.

When a liquid crystal composite material is comprised by mixing the compounds of formula (1) into the above-described compounds, it is preferable for the compounds of formula (1) to be mixed in with a ratio of 5–70% by weight of the liquid crystal composite material as a whole.

When a liquid crystal composite material is comprised by mixing the compounds of formula (2) into the above-described compounds, it is preferable for the compounds of formula (2) to be mixed in with a ratio of 3–20% by weight of the liquid crystal composite material as a whole. When these compounds are mixed in at less than 3% by weight, the effects achieved by containing these compounds are very small. When 20% by weight is exceeded, there is a possibility of separation. By mixing in the compounds of formula (2) in this range, a composite material is obtained in which the N-I point is high and $\Delta$n is large.

When a liquid crystal composite material is comprised by mixing the compounds of formula (3) into the above-described compounds, it is preferable for the compounds of formula (3) to be mixed in with a ratio of 5–20% by weight of the liquid crystal composite material as a whole. When these compounds are mixed in at less than 5% by weight, the effects achieved by containing these compounds are very small. When 20% by weight is exceeded, the N-I point of the composite material decreases sharply. By mixing in the compounds of formula (3) in this range, a composite material is obtained in which the drive voltage is low and $\Delta$n is large.

When a liquid crystal composite material is comprised by mixing the compounds of formula (4) into the above-described compounds, it is preferable for the compounds of formula (4) to be mixed in with a ratio of 5–20% by weight of the liquid crystal composite material as a whole. When these compounds are mixed in at less than 5% by weight, the effects achieved by containing these compounds are very small. When 20% by weight is exceeded, there is a possibility of separation. By mixing in the compounds of formula (4) in this range, a composite material is obtained in which the N-I point is high and $\Delta$n is large.

When a liquid crystal composite material is comprised by mixing the compounds of formula (5) into the above-described compounds, it is preferable for the compounds of formula (5) to be mixed in with a ratio of 5–20% by weight of the liquid crystal composite material as a whole. When these compounds are mixed in at less than 5% by weight, the effects achieved by containing these compounds are very small. When 20% by weight is exceeded, the N-I point of the composite material decreases sharply. By mixing in the compounds of formula (5) in this range, a composite material is obtained in which the drive voltage is low and $\Delta$n is large.

When a liquid crystal composite material is comprised by mixing the compounds of formula (6) into the above-described compounds, it is preferable for the compounds of formula (6) to be mixed in with a ratio of 5–20% by weight of the liquid crystal composite material as a whole. When these compounds are mixed in at less than 5% by weight, the effects achieved by containing these compounds are very small. When 20% by weight is exceeded, there is a possibility of separation. By mixing in the compounds of formula (6) in this range, a composite material is obtain in which the N-I point is high and $\Delta$n is large.

When a liquid crystal composite material is comprised by mixing the compounds of formula (7) into the above-described compounds, it is preferable for the compounds of formula (7) to be mixed in with a ratio of 1–20% by weight of the liquid crystal composite material as a whole. In consideration of crystallization and separation in low temperature regions, it is more preferable for the compounds of formula (7) to be mixed in with a ratio of 1–10% by weight of the liquid crystal composite material as a whole.

It is also possible to comprise a liquid crystal composite material by mixing together the compounds of formulas (1) through (7) with each other.

Furthermore, it is preferable to comprise a liquid crystal composite material by mixing together the compounds of formulas (2), (3) and (4). It is more preferable to comprise a liquid crystal composite material by mixing together a compound of formula (2) in which at least one of the hydrogen atoms in the three benzene rings on the cyano radical side is displaced by a fluorine atom; a compound of formula (3) ; and a compound of formula (4) in which at least one of the hydrogen atoms at the ortho position with respect to the cyano radical, out of the hydrogen atoms in the benzene ring which is directly bonded to the cyano radical, is displaced by a fluorine atom. It is even more preferable to comprise a liquid crystal composite material by mixing together a compound of formula (2) in which at least one of the hydrogen atoms in the ortho position with respect to the cyano radical, out of the hydrogen atoms of the benzene ring which is directly bonded to the cyano radical, is displaced by a fluorine atom; a compound of formula (3); and a compound of formula (4) in which at least one of the hydrogen atoms at the ortho position with respect to the cyano radical, out of the hydrogen atoms in the benzene ring which is directly bonded to the cyano radical, is displaced by a fluorine atom. In addition to obtaining a liquid crystal composite material with high N-I point and large double refraction index, it is possible to lower the drive voltage of the liquid crystal display device which uses this liquid crystal composite material. It is also possible to lower the drive voltage of a liquid crystal display device of polymer-dispersion type which uses this liquid crystal composite material.

It is also preferable to comprise a liquid crystal composite material by mixing together compounds of formula (2) and of formula (4). It is more preferable to comprise a liquid crystal composite material by mixing together a compound of formula (2) in which at least one of the hydrogen atoms in the three benzene rings on the cyano radical side, is displaced by a fluorine atom, and a compound of formula (4) in which at least one of the hydrogen atoms at the ortho position with respect to the cyano radical, out of the hydrogen atoms in the benzene ring which is directly bonded to the cyano radical, is displaced by a fluorine atom. It is even more preferable to comprise a liquid crystal composite material by mixing together a compound of formula (2) in which at least one of the hydrogen atoms in the ortho position with respect to the cyano radical, out of the hydrogen atoms of the benzene ring which is directly bonded to the cyano radical, is displaced by a fluorine atom, and a compound of formula (4) in which at least one of the hydrogen atoms at the ortho position with respect to the cyano radical, out of the hydrogen atoms in the benzene ring which is directly bonded to the cyano radical, is displaced by a fluorine atom. In addition to obtaining a liquid crystal composite material with high N-I point and large double refraction index, it is possible to lower the drive voltage of the liquid crystal display device which uses this liquid crystal composite material. It is also possible to lower the drive voltage of a liquid crystal display device of polymer-dispersion type which uses this liquid crystal composite material.

The light-scattering layer which contains the liquid crystal and polymer used in a liquid crystal display device of polymer-dispersion type is preferably a layer which is formed by creating a mixed liquid in which the liquid crystal and either a polymer or polymer precursor are fused together, by positioning this mixed liquid between the electrodes and by causing the mixed liquid to separate into the liquid crystal and the polymer by mutual separation means. As this mutual separation means, preferably it is possible to use a method wherein ultraviolet rays irradiate the mixed layer, and the polymer precursor is caused to polymerize.

In addition, the light-scattering layer can be formed by creating a mixed liquid in which the liquid crystal and either a polymer or polymer precursor are fused together, by positioning this mixed liquid between the electrodes and by causing the mixed liquid to separated into the liquid crystal and the polymer by means of a mutual separation means when the mixed liquid is in a liquid crystal phase state. In this method of formation, an orientation process is conducted by rubbing the substrate. The mixed liquid takes on a liquid crystal phase, and the liquid crystal and polymer enter an oriented state. If during this state, for example, ultraviolet rays cause the polymer precursor to polymerize and cause mutual separation, it is possible to maintain the state in which the liquid crystal is oriented. Thus, the mixed liquid being in a liquid crystal phase means a state with the mixed liquid oriented in a certain state.

It is possible to add a chiral component to the mixed liquid in which the liquid crystal and polymer or polymer precursor are mixed. By adding a chiral component, it is possible to solve the problem that the view of the liquid crystal display device differs depending on the viewing angle. When dichroic dyes are included, it is possible to boost the contrast by causing a twisted structure to be created in the dichroic dyes.

When the liquid crystal display device has a layer between the electrodes in which the liquid crystal and polymer are oriented and dispersed, it is possible for a dichroic dye to also be contained in the liquid crystal. By so doing, it is possible to obtain a liquid crystal display device wherein the liquid crystal and polymer are made transparent when no voltage is impressed. Incedent light is absorbed by the dichroic dye so that the display becomes a black display. When a voltage is impressed, the incident light is dispersed and a white display results.

As the type of polymer precursor which is used in the PDLC, it is preferable to use at least one type of compound represented by the general formula

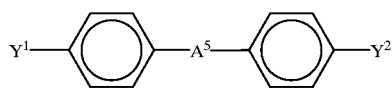

(8)

wherein $Y^1$ and $Y^2$ represent methacrylate groups, acrylate groups, hydrogen atoms, alkyl groups, alkoxy groups, fluorine atoms or cyano groups, and at least one of $Y^1$ and $Y^2$ represents either a methacrylate radical or an acrylate radical; and $A^5$ either does not exist so that the benzene groups on both sides thereof are directly bonded through a simple bond, or $A^5$ represents one of the following:

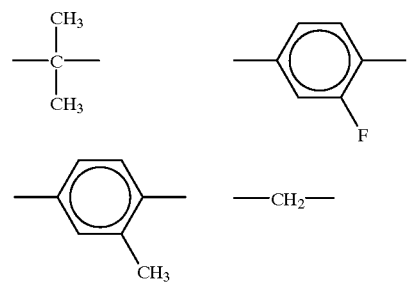

or an oxygen atom, or a sulfur atom; and the hydrogen atoms in the benzene rings on both sides of $A^5$ are all hydrogen atoms, or at least one of the hydrogen atoms is displaced by a halogen atom.

In the liquid crystal display device provided with a layer between the electrodes in which the liquid crystal and polymer are oriented and dispersed, it is particularly preferable to use the above-described polymer precursor when a compound of formula (5) and a compound of formula (6) are mixed together in the liquid crystal and even when a compound of formula (7) is mixed into the liquid crystal.

It is preferable to perform a process to reduce surface reflection on the display-side surface of the liquid crystal display device. This is in order to prevent reflecting a background and the user himself.

It is possible to provide a solar cell on the back surface of the liquid crystal display device. In particular, in the case of a transmission-type liquid crystal display device using a PDLC, it is possible to effectively use a solar cell because the transmittance of light is high.

It is also possible to make a color display by positioning a color filter between the substrate of the liquid crystal display device and the liquid crystal layer or the polymer-dispersion liquid crystal layer.

DETAILED DESCRIPTION OF PREFERRED EMBODIMENTS

Embodiment 1

Figure 1:
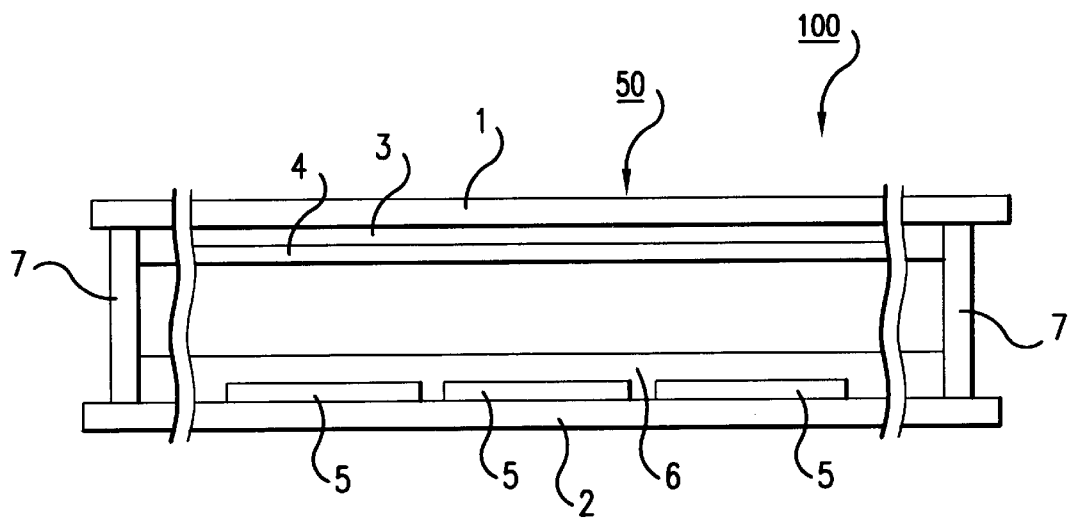
FIG. 1 is a schematic diagram of an empty panel used in embodiments 7 through 36 of the present invention, and of a liquid crystal display device which is produced with these embodiments.

With the present embodiment, a liquid crystal composite material containing the compounds of formula (2), the compounds of formula (3) and the compounds of formula (4) is described. Table 1 shows the liquid crystal composite material used in the present embodiment.

The liquid crystal created in this way (hereafter abbreviated as LC1) has an N-I point of 78° C., a dielectric constant non-isotropy $\Delta\epsilon$ of 37, and a refraction index non-isotropy $\Delta n$ of 0.23.

The ratios of mixing of the various compounds need not be the values shown here, for it is desirable to optimize the values in accordance with the application. In addition, the structure of each of the compounds need not be as shown here, for it is desirable to optimize the length of the alkyl groups, the number of fluorine displacements and the displacement positions in accordance with the application. This is true not only for the present embodiment, but also for each of the embodiments described hereafter.

TABLE 1

| Compounds of Formula (2) | $A^2$ = cyclohexane, with one F at the CN ortho position | $R^2$ = propyl radical<br>$R^2$ = pentyl radical | 5% by weight<br>5% by weight |
|---|---|---|---|
| Compounds of Formula (3) | $A^3$ = pyrimidine ring, $R^3$ = ethyl radical<br>$A^3$ = pyridine ring, $R^3$ = pentyl radical | | 27% by weight<br>27% by weight |
| Compounds of Formula (4) | $A^4$ = nonexistent, $R^4$ = ethyl radical<br>$A^4$ = nonexistent,<br>with one F at the CN ortho position<br>$A^4$ = cyclohexane,<br>X = propyl radical | $R^4$ = propyl radical<br>$R^4$ = butyl radical<br>$R^4$ = ethyl radical<br>$R^4$ = propyl radical<br>$R^4$ = butyl radical | 9% by weight<br>9% by weight<br>9% by weight<br>3% by weight<br>3% by weight<br>3% by weight |

In Table 1, the compound in which "X=propyl radical" is designated represents a compound in which a propyl radical is bonded in place of the CN radical. The compounds in which "one F at the CN ortho position" is not designated represent compounds in which the hydrogen atoms in the compound are not displaced by a halogen atom such as F or the like.

Embodiment 2

With the present embodiment, a liquid crystal composite material containing the compounds of formula (3) and the compounds of formula (4) is described. Table 2 shows the liquid crystal composite material created in the present embodiment.

The liquid crystal created in this way (hereafter abbreviated as LC2) has an N-I point of 51° C., a dielectric constant anisotropy $\Delta\epsilon$ of 37.8, and a relective index anisotropy $\Delta n$ of 0.21.

TABLE 2

| Compounds of Formula (3) | $A^3$ = pyrimidine ring, $R^3$ = ethyl radical<br>$A^3$ = pyridine ring, $R^3$ = pentyl radical | | 30% by weight<br>30% by weight |
|---|---|---|---|
| Compounds of Formula (4) | $A^4$ = nonexistent, $R^4$ = ethyl radical<br>$A^4$ = nonexistent,<br>with one F at the CN ortho position<br>$A^4$ = cyclohexane,<br>X = propyl radical | $R^4$ = propyl radical<br>$R^4$ = butyl radical<br>$R^4$ = ethyl radical<br>$R^4$ = propyl radical<br>$R^4$ = butyl radical | 10% by weight<br>9% by weight<br>9% by weight<br>4% by weight<br>4% by weight<br>4% by weight |

In Table 2, the compound in which "X=propyl radical" is designated represents a compound in which a propyl radical is bonded in place of the CN radical. The compounds in which "one F at the CN ortho position" is not designated represent compounds in which the hydrogen atoms in the compound are not displaced by a halogen atom such as F or the like.

Embodiment 3

With the present embodiment, a liquid crystal composite material containing the cyclohexane-based compounds of formula (2), the compounds of formula (3) and the compounds of formula (4) is described. Table 3 shows the liquid crystal composite material created in the present embodiment.

The liquid crystal created in this way (hereafter abbreviated as LC3) has an N-I point of 88° C., a dielectric constant non-isotropy Δε of 44, and a refraction index non-isotropy Δn of 0.20.

In Table 3, the compounds in which "one F at the CN ortho position" is not designated represent compounds in which the hydrogen atoms in the compound are not displaced by a halogen atom such as F or the like.

In the present embodiment, the cyclohexane-based compound which is the compound of formula (3) is mixed in intentionally, but it would be fine to omit this compound.

Embodiment 4

With the present embodiment, a liquid crystal composite material containing the cyclohexane-based compounds of formula (3) and the compounds of formula (4) is described. Table 4 shows the liquid crystal composite material created in the present embodiment.

The liquid crystal created in this way (hereafter abbreviated as LC4) has an N-I point of 62° C., a dielectric constant non-isotropy ΔE of 45.6, and a refraction index non-isotropy Δn of 0.16.

TABLE 3

| Compounds of Formula (2) | $A^2$ = cyclohexane, with one F at the CN ortho position | $R^2$ = propyl radical | 5% by weight |
| --- | --- | --- | --- |
| | | $R^2$ = pentyl radical | 5% by weight |
| Compounds of Formula (3) | $A^3$ = cyclohexane | $R^3$ = propyl radical | 12% by weight |
| Compounds of Formula (4) | $A^4$ = nonexistent | $R^4$ = ethyl radical | 4% by weight |
| | | $R^4$ = propyl radical | 4% by weight |
| | $A^4$ = nonexistent, with one F at the CN ortho position | $R^4$ = ethyl radical | 4% by weight |
| | | $R^4$ = propyl radical | 7% by weight |
| | | $R^4$ = butyl radical | 11% by weight |
| | | $R^4$ = pentyl radical | 12% by weight |
| | $A^4$ = cycLohexane, with one F at the CN ortho position | $R^4$ = propyl radical | 7% by weight |
| | | $R^4$ = butyl radical | 7% by weight |
| | | $R^4$ = pentyl radical | 6% by weight |
| Others | | | 6% by weight |
| | 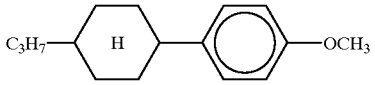 | | |
| | | | 10% by weight |
| | 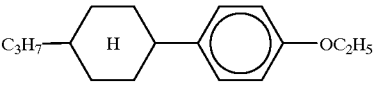 | | |

TABLE 4

| Compounds of Formula (3) | $A^3$ = cyclohexane | $R^3$ = propyl radical | 13% by weight |
| --- | --- | --- | --- |
| Compounds of Formula (4) | $A^4$ = nonexistent | $R^4$ = ethyl radical | 5% by weight |
| | | $R^4$ = propyl radical | 5% by weight |
| | $A^4$ = nonexistent, with one F at the CN ortho position | $R^4$ = ethyl radical | 4% by weight |
| | | $R^4$ = propyl radical | 8% by weight |
| | | $R^4$ = butyl radical | 12% by weight |
| | | $R^4$ = pentyl radical | 14% by weight |
| | $A^4$ = cyctohexane, with one F at the CN ortho position | $R^4$ = propyl radical | 8% by weight |
| | | $R^4$ = butyl radical | 8% by weight |
| | | $R^4$ = pentyl radical | 7% by weight |
| Others | | | 6% by weight |
| | 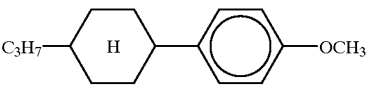 | | |
| | | | 10% by weight |
| | 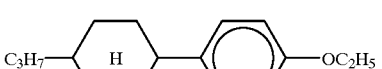 | | |

In this Table 4, the compounds in which "one F at the CN ortho position" is not designated represent compounds in which the hydrogen atoms in the compound are not displaced by a halogen atom such as F or the like.

Embodiment 5

With the present embodiment, a liquid crystal composite material containing the compounds of formula (2), the compounds of formula (3) and the compounds of formula (4) and which is an example that uses the quarter (?) phenyl compounds in the compounds of formula (2) is described. Table 5 shows the liquid crystal composite material created in the present embodiment.

The liquid crystal created in this way (hereafter abbreviated as LC5) has an N-I point of 73° C., a dielectric constant non-isotropy $\Delta\epsilon$ of 37, and a refraction index non-isotropy $\Delta n$ of 0.25.

In Table 5, the compound in which "X=propyl radical" is designated represents a compound in which a propyl radical is bonded in place of the CN radical. The compounds in which "one F at the CN ortho position" is not designated represent compounds in which the hydrogen atoms in the compound are not displaced by a halogen atom such as F or the like.

TABLE 5

| Compounds of Formula (2) | $A^2$ = phenyl, with one F at the CN ortho position | $R^2$ = propyl radical<br>$R^2$ = pentyl radical | 5% by weight<br>5% by weight |
|---|---|---|---|
| Compounds of Formula (3) | $A^3$ = pyrimidine ring, $R^3$ = ethyl radical<br>$A^3$ = pyridine ring, $R^3$ = pentyl radical | | 27% by weight<br>27% by weight |
| Compounds of Formula (4) | $A^4$ = nonexistent, $R^4$ = ethyl radical<br>$A^4$ = nonexistent, with one F at the CN ortho position | $R^4$ = propyl radical<br>$R^4$ = butyl radical | 9% by weight<br>9% by weight<br>9% by weight |
| | $A^4$ = cyclohexane,<br>X = propyl radical | $R^4$ = ethyl radical<br>$R^4$ = propyl radical<br>$R^4$ = butyl radical | 3% by weight<br>3% by weight<br>3% by weight |

Embodiment 6

With the present embodiment, a liquid crystal composite material containing the compounds of formula (2), the compounds of formula (3) and the compounds of formula (4) and which is an example that uses the difluoride compounds in the compounds of formula (2) is described. Table 6 shows the liquid crystal composite material created in the present embodiment.

The liquid crystal created in this way (hereafter abbreviated as LC6) has an N-I point of 70° C., a dielectric constant non-isotropy $\Delta\epsilon$ of 40, and a refraction index non-isotropy $\Delta n$ of 0.23.

TABLE 6

| Compounds of Formula (2) | $A^2$ = cyclohexane, with two F, both at CN ortho positions | $R^2$ = propyl radical<br>$R^2$ = pentyl radical | 5% by weight<br>5% by weight |
|---|---|---|---|
| Compounds of Formula (3) | $A^3$ = pyrimidine ring, $R^3$ = ethyl radical<br>$A^3$ = pyridine ring, $R^3$ = pentyl radical | | 27% by weight<br>27% by weight |
| Compounds of Formula (4) | $A^4$ = nonexistent, $R^4$ = ethyl radical<br>$A^4$ = nonexistent, with one F at the CN ortho position | $R^4$ = propyl radical<br>$R^4$ = butyl radical | 9% by weight<br>9% by weight<br>9% by weight |
| | $A^4$ = cyclohexane,<br>X = propyl radical | $R^4$ = ethyl radical<br>$R^4$ = propyl radical<br>$R^4$ = butyl radical | 3% by weight<br>3% by weight<br>3% by weight |

In Table 6, the compound in which "X=propyl radical" is designated represents a compound in which a propyl radical is bonded in place of the CN radical. The compounds in which "one F at the CN ortho position" or "two F, both at CN ortho positions" are not designated represent compounds in which hydrogen atoms in the compound are not displaced by halogen atoms such as F or the like.

Embodiment 7

With the present embodiment, an example is shown wherein a liquid crystal display device is created using the liquid crystal composite material LC1 shown in Embodiment 1, and using a layer that is formed by a mixed liquid, wherein this liquid crystal and a polymer precursor are fused together, being caused to separate into the liquid crystal and the polymer when the mixed liquid is in a liquid crystal phase state.

First, an empty panel wherein the liquid crystal and polymer thus mutually separated are interposed will be described. FIG. 1 shows the composition of a liquid crystal display device 100 using the present embodiment. A transparent electrode film 3 composed of ITO (Indium Tin Oxide) was formed on the glass transparent substrate 1, an orienting film composed of polyamide was coated on the top thereof, and following this, an orientation control layer 4 was created by rubbing. A transparent electrode film 5 composed of ITO was formed on top of the glass transparent substrate 2, an orienting film composed of polyamide was coated on the top thereof and following this an orientation control layer 6 was formed by rubbing. An empty panel 50 was formed by sticking together the circumferences of the glass substrates 1 and 2 by means of a sealant 7 with the electrode surface to the inside, while maintaining a distance of 5 $\mu$m between the glass substrates 1 and 2. Next, into this empty panel 50 was inserted a mixed liquid of the liquid crystal and polymer substrate indicated hereafter.

The LC1 shown in Embodiment 1 was used as the liquid crystal. The liquid crystal was chiral nematic liquid crystal in which 1.5% by weight of CNL611L made by Asahi Denka Kogyo was added as the chiral component to 98.5% by weight liquid crystal. As the polymer precursor, 5% by weight of a mixture of butyl phenyl tranmethacrylate and biphenyl dimethacrylate in a 4:1 ratio was mixed into 95% by weight of the above-described chiral liquid crystal.

This mixed liquid was inserted into the empty panel 50 described above, the polymer precursor was polymerized under irradiation by ultraviolet rays (300 to 400 nm, 3.5 mW/cm$^2$) at 50° C., and the polymer was separated from the midst of the liquid crystal to produce the liquid crystal display device 100.

In the mixed liquid, the liquid crystal and polymer precursor are mixed together, and the mixed liquid is in a liquid crystal state. The substrate undergoes an orientation process through rubbing. Because the mixed liquid is in a liquid crystal state, the liquid crystal and the pre-polymer enter an oriented state when the mixed liquid is inserted into the empty panel 50. Because mutual separation is conducted by causing the polymer precursor to polymerize under irradiation by ultraviolet rays in this state, the state wherein the liquid crystal is oriented is maintained.

Figure 2:
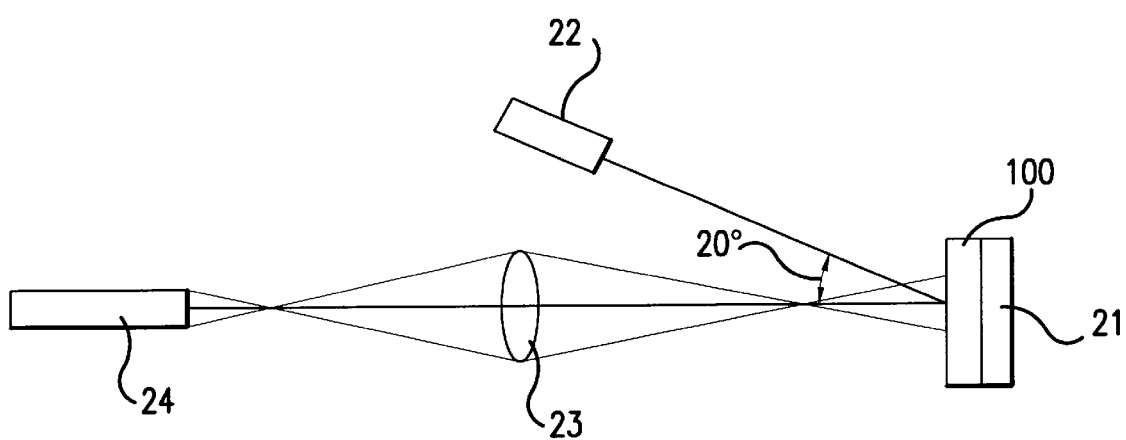
FIG. 2 is a drawing showing the optical system when the electrooptical properties of the liquid crystal display device in embodiments 7 through 36 of the present invention are measured.

On the back surface of the liquid crystal display device 100 produced in this manner, a solar cell 21 was placed as a reflective plate, and the reflectivity was measured (See FIG. 2) while impressing an electric field between the electrodes 3 and 5. At this time, light from a light source 22 in a direction inclined 20 degrees from the normal was incident on the front surface of the liquid crystal display device 100, and the intensity of the light reflected in the direction of the normal was measured using an imaging lens 23 and a photomultiplier tube 24. In the embodiments which follow, a similar measuring method was also used.

Figure 3:
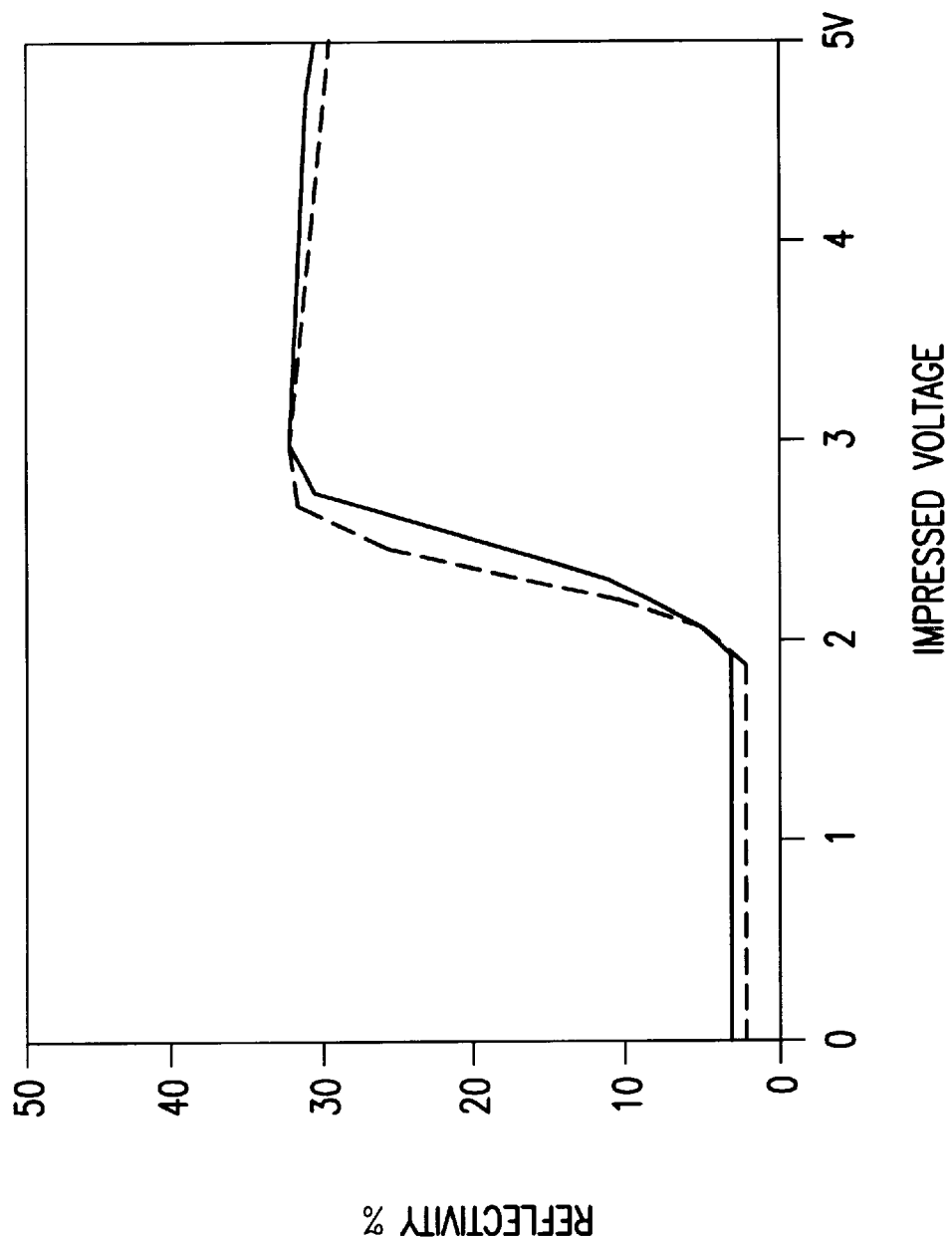
FIG. 3 is a drawing showing the electrooptical properties of the liquid crystal display devices of embodiments 7 and 8 of the present invention.

The relationship between the impressed voltage and the reflectivity is indicated by the solid line in FIG. 3. In addition, simple matrix driving was possible with a duty of 1/1 to ⅛. Furthermore, when thermal durability was tested at 70° C., there was no change after 8 hours of heating.

For the polymer precursor in the present embodiment, a mixture of butyl phenyl tranmethacrylate and biphenyl dimethacrylate was used, but it is also possible to use instead phenyl methacrylate, biphenyl methacrylate, ter phenyl methacrylate, quarter phenyl methacrylate and tranmethacrylate, as well as compounds wherein these are the main skeleton. If these kinds of polymer precursor are used, the polymer ends up in a granular state following polymerization by ultraviolet rays.

The chiral component is added in order to cause the liquid crystal component to be twisted. Here, a chiral component was used in which the temperature dependence of the chiral pitch was extremely small, but this is intended to be illustrative and not limiting. For example, it is possible to use S (or R) 1011, S (or R) 811, CB15, CE2 and the like made by Merck & Co., the CM series such as CM20 made by Chisso Corp., or the CNL series made by Asahi Denka Kogyo. For the amount of chiral component that is added, it is preferable for the direction of the liquid crystal orientation to be in the direction of thickness of the panel and to be controlled to 20–450 degrees. At less than 20 degrees, there is substantially no effect from adding the chiral component. When 450 degrees is exceeded, the drive voltage becomes large. Within the 20–450 degree range, the scattering is large from all directions when the compounds are made into a display device, and the device becomes a bright device. In addition, the drive voltage is low. It is more preferable for the direction of the liquid crystal orientation to be in the direction of thickness of the panel and to be controlled to 50–280 degrees.

For the orientation processing of the electrode surfaces, generally a rubbing process is conducted following the formation of an orienting film such as polyamide or the like as described above. It would also be fine to rub the electrodes directly without forming an orientation film.

In the above description, the distance between the two electrodes was taken to be 5 μm, but it is not mandatory that it be 5 μm. When the separation is smaller than 5 μm, the drive voltage is lowered and the dispersion decreases. When the separation is larger than 5 μm, the drive voltage is raised and the dispersion increases. For this reason, it is best to adjust the separation in accordance with the application.

It is preferable to use ultraviolet rays of wavelength not greater than 400 nm and strength not greater than 100 mW/cm², more preferably an intensity of 20 - 1 mW/cm², to polymerize the polymer precursor. It is also possible to polymerize the polymer precursor using electron beams. In that case, it is preferable for the thickness of the glass substrate to be not greater than 100 μm so that the electron beams can pass through easily.

Embodiment 8

With the present embodiment, a liquid crystal display device was created using the liquid crystal LC2 created in Embodiment 2 and with all other materials and conditions being in accordance with Embodiment 7, and the electrooptical properties of this device were measured (see the dashed line in FIG. 3).

Embodiment 9

With the present embodiment, an example is shown using P1

Figure 4:
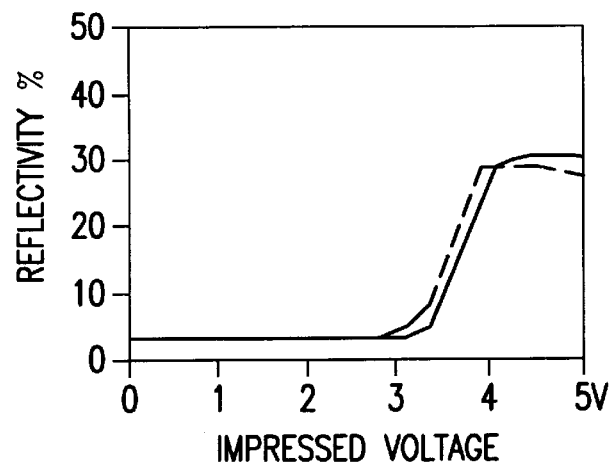
FIG. 4 is a drawing showing the electrooptical properties of the liquid crystal display devices of embodiments 9 and 10 of the present invention.

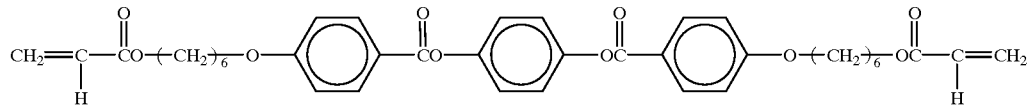

as the polymer precursor. When a polymer precursor having this kind of long alkyl chain is used, the polymer has a gel-like network structure. In the present embodiment, materials other than the polymer and all other conditions are the same as in Embodiment 7. A liquid crystal display device was produced by mixing 3% by weight of P1 with 97% by weight of the chiral liquid crystal. The electrooptical properties of the liquid crystal display device produced in this manner are shown by the solid line in FIG. 4. Simple matrix driving with a duty of 1/1 to ⅛ was possible.

Besides P1, the polymer precursor used can be any polymerized compound having a similar composition. Among products on the market, it is possible to use aronics and rezedamakuro monomer produced by Toagosei; KAYARAD and KAYAMER produced by Nippon Kayaku; nopucoma, SICOMET and fotomer made by San Nopco Ltd.; epototo, eototo, topuren and dapputoto produced by Toto Kasei; epikoto produced by Yuka Shell; adekarejin, adekaoptoma, and adekaoputon made by Asahi Denka Kogyo; the 2200 series produced by Three Bond; ripokishi and supurakku produced by Showa Highpolymer; and Nippon Polyurethane Industry Co. products. It is fine to mix in part of these monomers into the polymer precursor indicated by Embodiment 7 (the example where the polymer is granule-like.)

Embodiment 10

With the present embodiment, the liquid crystal LC2 of Embodiment 2 was used as the liquid crystal, and all other conditions were the same as in Embodiment 9. A liquid crystal display device was produced in accordance with Embodiment 9, and the electrooptical properties were measured (see the dashed line in FIG. 4).

Embodiment 11

Figure 5:
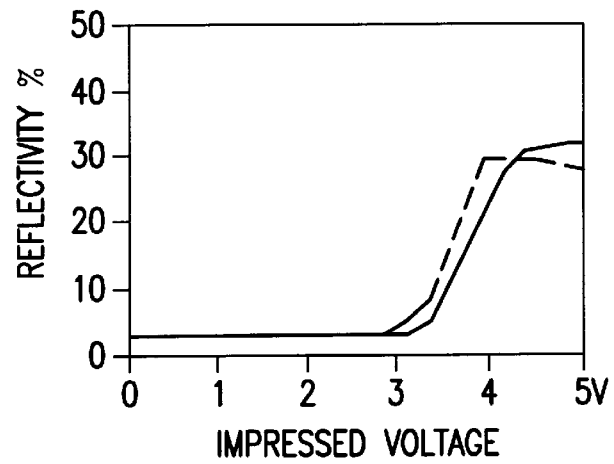
FIG. 5 is a drawing showing the electrooptical properties of the liquid crystal display devices of embodiments 11 and 12 of the present invention.

With the present embodiment, the liquid crystal LC3 created in Embodiment 3 was used, and a liquid crystal display device was produced in accordance with embodiment 7. The electrooptical properties of the liquid crystal display device thus produced are shown by the solid line in FIG. 5. Simple matrix driving with a duty of 1/1 to ⅛ was possible. Furthermore, when the thermal durability was tested at 70° C., no change was observed after 8 hours of heating.

Embodiment 12

With the present embodiment, the liquid crystal LC4 created in Embodiment 4 was used, and a liquid crystal display device was produced in accordance with embodiment 7. The electrooptical properties of the liquid crystal display device thus produced are shown by the dashed line in FIG. 5.

Embodiment 13

Figure 6:
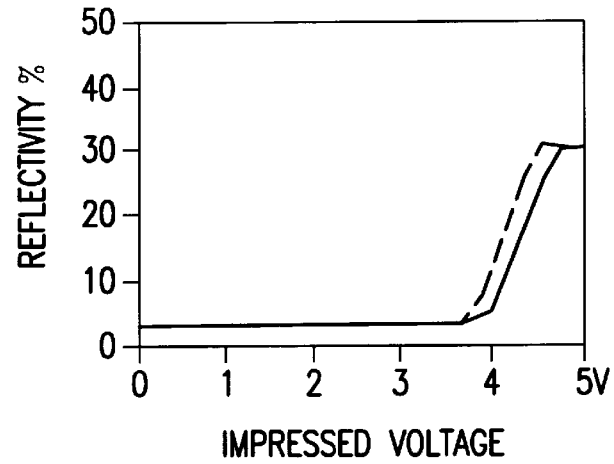
FIG. 6 is a drawing showing the electrooptical properties of the liquid crystal display devices of embodiments 13 and 14 of the present invention.

With the present embodiment, the liquid crystal LC3 created in Embodiment 3 and the polymer precursor PI used in Embodiment 9 were used, and a liquid crystal display device was produced in accordance with Embodiment 9. The electrooptical properties of the liquid crystal display device thus produced are shown by the solid line in FIG. 6. Simple matrix driving with a duty of 1/1 to 1/8 was possible. Furthermore, when the thermal durability was tested at 70° C., no change was observed after 8 hours of heating.

Embodiment 14

With the present embodiment, the liquid crystal LC4 created in Embodiment 4 and the polymer precursor P1 used in Embodiment 9 were used, and a liquid crystal display device was produced in accordance with Embodiment 9. The electrooptical properties of the liquid crystal display device thus produced are shown by the dashed line in FIG. 6.

Embodiment 15

Figure 7:
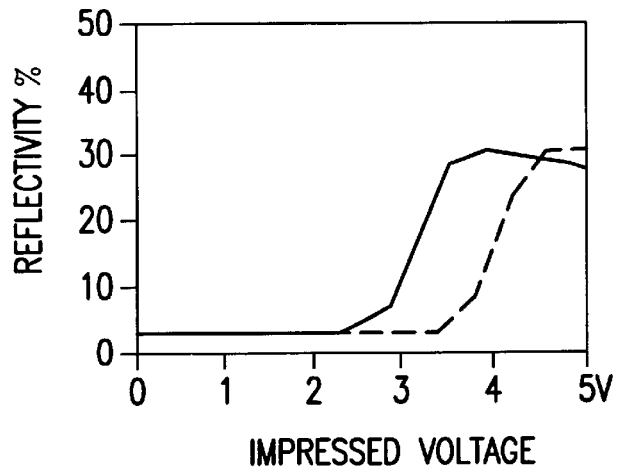
FIG. 7 is a drawing showing the electrooptical properties of the liquid crystal display devices of embodiments 15 and 16 of the present invention.

With the present embodiment, the liquid crystal LC5 created in Embodiment 5 was used, and a liquid crystal display device was produced in accordance with Embodiment 7. The electrooptical properties of the liquid crystal display device thus produced are shown by the solid line in FIG. 7. Simple matrix driving with a duty of 1/1 to 1/8 was possible. Furthermore, when the thermal durability was tested at 70° C., no change was observed after 8 hours of heating.

Embodiment 16

With the present embodiment, the liquid crystal LC5 created in Embodiment 5 and the polymer precursor PI used in Embodiment 9 were used, and a liquid crystal display device was produced in accordance with Embodiment 9. The electrooptical properties of the liquid crystal display device thus produced are shown by the dashed line in FIG. 7. Simple matrix driving with a duty of 1/1 to 1/8 was possible. Furthermore, when the thermal durability was tested at 70° C., no change was observed after 8 hours of heating.

Embodiment 17

Figure 8:
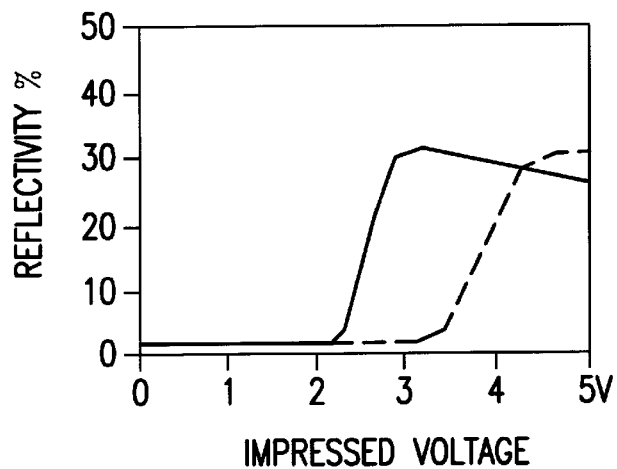
FIG. 8 is a drawing showing the electrooptical properties of the liquid crystal display devices of embodiments 17 and 18 of the present invention.

With the present embodiment, the liquid crystal LC6 created in Embodiment 6 was used, and a liquid crystal display device was produced in accordance with Embodiment 7. The electrooptical properties of the liquid crystal display device thus produced are shown by the solid line in FIG. 8. Simple matrix driving with a duty of 1/1 to 1/8 was possible. Furthermore, when the thermal durability was tested at 70° C., no change was observed after 8 hours of heating.

Embodiment 18

With the present embodiment, the liquid crystal LC6 created in Embodiment 6 and the polymer precursor P1 used in Embodiment 9 were used, and a liquid crystal display device was produced in accordance with Embodiment 9. The electrooptical properties of the liquid crystal display device thus produced are shown by the dashed line in FIG. 8. Simple matrix driving with a duty of 1/1 to 1/8 was possible. Furthermore, when the thermal durability was tested at 70° C., no change was observed after 8 hours of heating.

Embodiment 19

Figure 9:
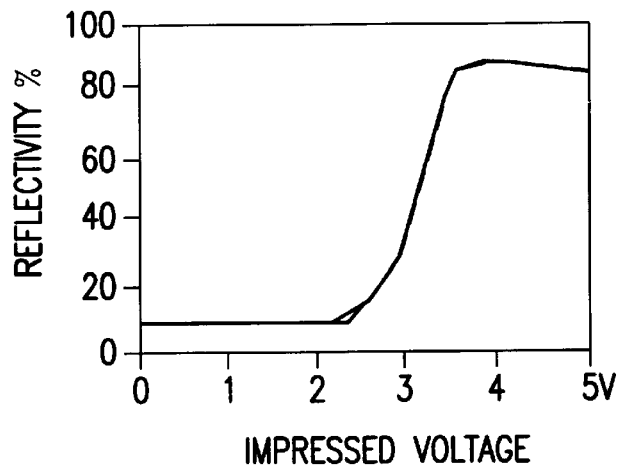
FIG. 9 is a drawing showing the electrooptical properties of the liquid crystal display devices of embodiments 19 and 20 of the present invention.

With the present embodiment, an example is shown wherein a dichroic dye is mixed into the liquid crystal LC1 created in Embodiment 1. For the empty panel created here, the device shown in Embodiment 7 wherein the electrode 5 is formed of aluminum was used. In addition, a guest-host liquid crystal was used wherein to the liquid crystal LC1 were added 0.8% by weight of S1011 produced by Merck as the chiral component; and as the dichroic dyes, 1.5%, 2% and 0.5% by weight of M361 (yellow), SI512 (violet) and M34 (blue), respectively, all produced by Mitsui Toatsu Senryo. When the liquid crystal display device was produced in accordance with Embodiment 7, it became possible to conduct light dispersion (white display) by impressing an electric field and to conduct light absorption (black display) by not impressing an electric field (see the solid line in FIG. 9). Simple matrix driving with a duty of 1/1 to 1/8 was also possible. In addition, during thermal durability testing at 70° C., no changes were observed. With the present embodiment, a reflective layer was created on the electrode 5. Consequently, it was not necessary to place a light absorbing plate or a light reflecting plate such as a solar cell or the like on the back surface of the liquid crystal display device 100.

As the dichroic dye used here, it is preferable to use an anthraquinone-based or a perylene-based pigment having good optical resilience. An azo-based pigment may also be used for applications that do not require reliability.

Embodiment 20

With the present embodiment, the liquid crystal LC2 of E2 was used as the liquid crystal, and all other conditions were the same as in Embodiment 19. A liquid crystal display device was produced similar to Embodiment 19, and the electrooptical properties were measured (see the dashed line in FIG. 9).

Embodiment 21

Figure 10:
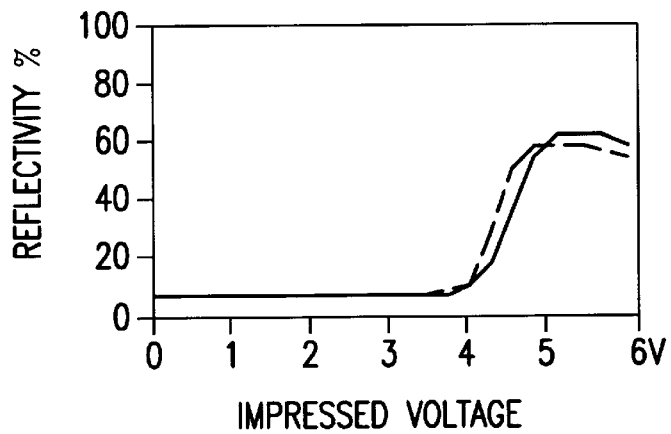
FIG. 10 is a drawing showing the electrooptical properties of the liquid crystal display devices of embodiments 21 and 22 of the present invention.

With the present embodiment, P1 shown in Embodiment 9 was used as the polymer precursor, and all other conditions were the same as in Embodiment 19. A liquid crystal display device was created in accordance with Embodiment 9 regarding the polymer precursor, and in accordance with Embodiment 19 regarding all other conditions. It was possible to conduct light dispersion (white display) by impressing an electric field and to conduct light absorption (black display) by not impressing an electric field (see the solid line in FIG. 10). Simple matrix driving with a duty of 1/1 to 1/8 was also possible. In addition, during thermal durability testing at 70° C., no changes were observed.

Embodiment 22

With the present embodiment, the liquid crystal LC2 of Embodiment 2 was used as the liquid crystal, and all other conditions were the same as in Embodiment 21. A liquid crystal display device was produced similar to Embodiment 19, and the electrooptical properties were measured (see the dashed line in FIG. 10).

Embodiment 23

Figure 11:
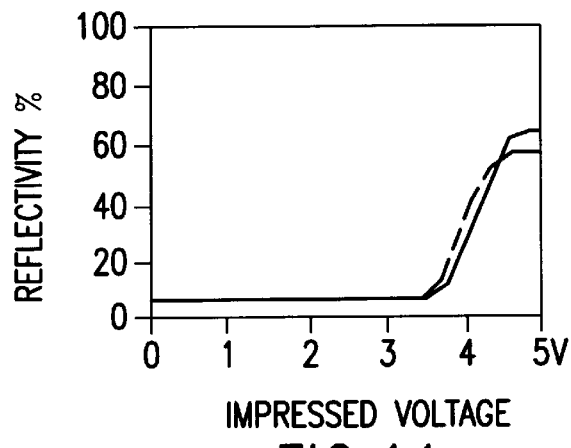
FIG. 11 is a drawing showing the electrooptical properties of the liquid crystal display devices of embodiments 23 and 24 of the present invention.

With the present embodiment, the liquid crystal LC3 of Embodiment 3 was used as liquid crystal, and all other conditions were the same as in Embodiment 19. When a liquid crystal display device was created in accordance with Embodiment 19, it became possible to conduct light dispersion (white display) by impressing an electric field and to conduct light absorption (black display) by not impressing an electric field (see the solid line in FIG. 11). Simple matrix driving with a duty of 1/1 to 1/8 was also possible. In addition, during thermal durability testing at 70° C., no changes were observed.

Embodiment 24

With the present embodiment, the liquid crystal LC4 of Embodiment 4 was used as the liquid crystal, and all other conditions were the same as in Embodiment 23. A liquid crystal display device was produced similar to Embodiment 23, and the electrooptical properties were measured (see the dashed line in FIG. 11).

Embodiment 25

Figure 12:
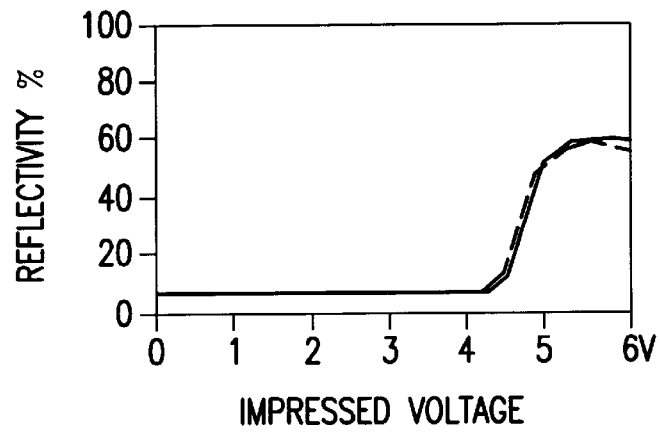
FIG. 12 is a drawing showing the electrooptical properties of the liquid crystal display devices of embodiments 25 and 26 of the present invention.

With the present embodiment, the liquid crystal LC3 created in Embodiment 3 was used as the liquid crystal, and all other conditions were the same as in Embodiment 21. A liquid crystal display device was created in accordance with Embodiment 21 (see the solid line in FIG. 12). Simple matrix driving with a duty of 1/1 to 1/8 was also possible. In addition, during thermal durability testing at 70° C., no changes were observed.

Embodiment 26

With the present embodiment, the liquid crystal LC4 of Embodiment 4 was used as the liquid crystal, and all other conditions were the same as in Embodiment 25. A liquid crystal display device was produced similar to Embodiment 25, and the electrooptical properties were measured (see the dashed line in FIG. 12).

Embodiment 27

Figure 13:
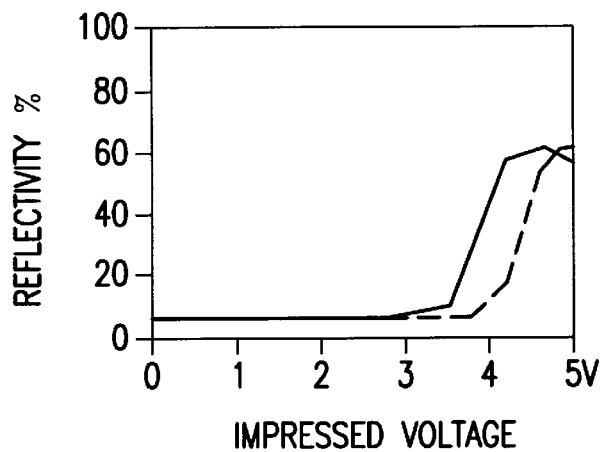
FIG. 13 is a drawing showing the electrooptical properties of the liquid crystal display devices of embodiments 27 and 28 of the present invention.

With the present embodiment, the liquid crystal LC5 created in Embodiment 5 was used as the liquid crystal, and all other conditions were the same as in Embodiment 19. When a liquid crystal display device was created in accordance with Embodiment 19, it became possible to conduct light dispersion (white display) by impressing an electric field and to conduct light absorption (black display) by not impressing an electric field (see the solid line in FIG. 13). Simple matrix driving with a duty of 1/1 to 1/8 was also possible. In addition, during thermal durability testing at 70° C., no changes were observed.

Embodiment 28

With the present embodiment, the liquid crystal LC5 of Embodiment 5 was used as the liquid crystal, and all other conditions were the same as in Embodiment 21. A liquid crystal display device was produced in accordance with Embodiment 21 (see the dashed line in FIG. 13). Simple matrix driving with a duty of 1/1 to 1/8 was also possible. In addition, during thermal durability testing at 70° C., no changes were observed.

Embodiment 29

Figure 14:
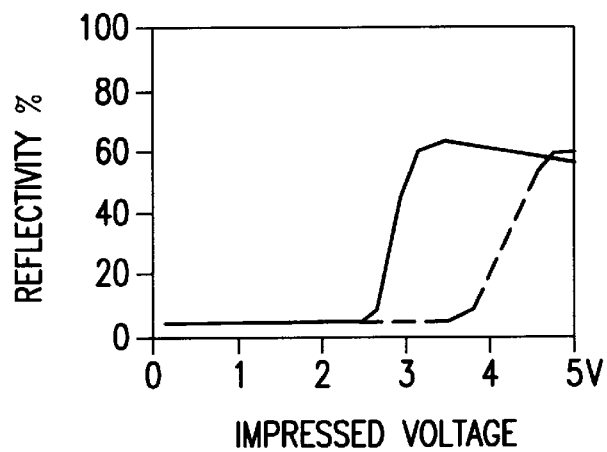
FIG. 14 is a drawing showing the electrooptical properties of the liquid crystal display devices of embodiments 29 and 30 of the present invention.

With the present embodiment, the liquid crystal LC6 created in Embodiment 6 was used as the liquid crystal, and all other conditions were the same as in Embodiment 19. When a liquid crystal display device was created in accordance with Embodiment 19, it became possible to conduct light dispersion (white display) by impressing an electric field and to conduct light absorption (black display) by not impressing an electric field (see the solid line in FIG. 14). Simple matrix driving with a duty of 1/1 to 1/8 was also possible. In addition, during thermal durability testing at 70° C., no changes were observed.

Embodiment 30

With the present embodiment, the liquid crystal LC6 of Embodiment 6 was used as the liquid crystal, and all other conditions were the same as in Embodiment 21. A liquid crystal display device was produced in accordance with Embodiment 21 (see the dashed line in FIG. 14). Simple matrix driving with a duty of 1/1 to 1/8 was also possible. In addition, during thermal durability testing at 70° C., no changes were observed.

Embodiment 31

With the present embodiment, an example is shown wherein a polymer gel network type of liquid crystal display device is produced using the liquid crystal composite material LC1 of Embodiment 1.

The liquid crystal was made to be a chiral nematic liquid crystal by adding as the chiral component 1.5% by weight CNL611L produced by Asahi Denka to 98.% by weight of the liquid crystal LC1. Furthermore, 5% by weight of M6200 produced by Toagosei was used as the polymer precursor, and 2% by weight of Irugacure 184 was used as the light polymerizing initiator. Besides these items, the liquid crystal display device was produced as in Embodiment 7. However, no orientation process was conducted on the electrode surfaces. During optical polymerizing of the polymer precursor, polymerizing was conducted in an isotropic phase at a temperature of 80° C.

The liquid crystal display device produced in this manner is transparent under an impressed voltage and dispersed when no voltage is impressed. The electrooptical properties of this liquid crystal display device were measured (see the solid line in FIG. 15.)

For the polymer precursor, it is possible to use the compound shown in Embodiment 9 with which creation of a gel network is easy.

It is also possible to use the liquid crystal composite materials shown in Embodiment 3, Embodiment 5 and Embodiment 6. In addition, it would be fine not to insert chiral components into the liquid crystal.

By adding dichroic dyes to the liquid crystal, it is possible to create transparency under an impressed electric field and light absorption and light dispersion caused by the pigments when no electric field is impressed.

Embodiment 32

Figure 15:
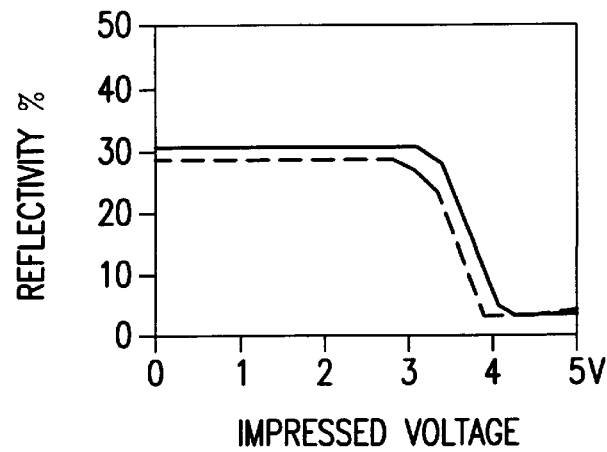
FIG. 15 is a drawing showing the electrooptical properties of the liquid crystal display devices of embodiments 31 and 32 of the present invention.

With the present embodiment, a liquid crystal display device was produced using the liquid crystal composite material LC2 of Embodiment 2 with all other conditions being the same as in Embodiment 31, and the electrooptical properties were measured (see the dashed line in FIG. 15).

Embodiment 33

With the present embodiment, an example is shown wherein a display device is produced in which liquid crystal droplets are dispersed in the polymer using the liquid crystal composite material LC5 of Embodiment 5.

Mixed into the liquid crystal composite material LC5 of Embodiment 5 were added 2% by weight R811 produced by Merck as the chiral component, 30% by weight of M6200 produced by Toagosei as the polymer precursor, and 2% by weight of Irugacure 184 as the light polymerizing initiator. Besides these items, the liquid crystal display device was produced exactly as in Embodiment 31.

Figure 16:
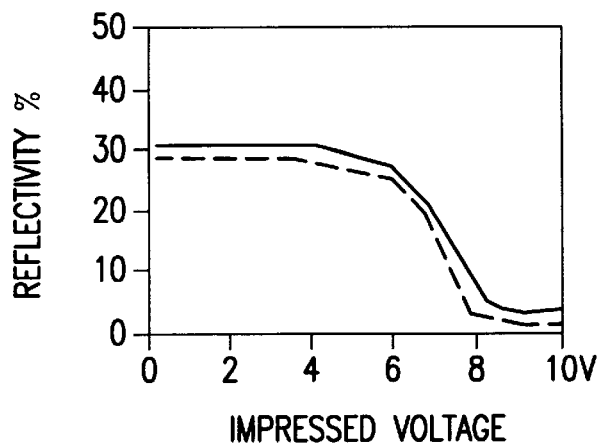
FIG. 16 is a drawing showing the electrooptical properties of the liquid crystal display devices of embodiments 33 and 34 of the present invention.

The electrooptical properties of the liquid crystal display device produced in this manner were measured (see the solid line in FIG. 16).

It is also possible to use the liquid crystal composite materials shown in Embodiment 3, Embodiment 5 and Embodiment 6. In addition, it would be fine not to insert chiral components into the liquid crystal.

By adding dichroic dyes to the liquid crystal, it is possible to create transparency under an impressed electric field and light absorption and light dispersion caused by the pigments when no electric field is impressed.

Embodiment 34

With the present embodiment, a liquid crystal display device was produced using the liquid crystal composite material of Embodiment 2 the same as in Embodiment 33, and the electrooptical properties were measured (see the dashed line in FIG. 16).

Embodiment 35

With the present embodiment, an example is shown wherein a capsule-type liquid crystal is dispersed in the polymer. First, 30% by weight of polyvinyl alcohol and 70% by weight of the liquid crystal composite material LC5 shown in Embodiment 5 were measured. The polyvinyl alcohol was dissolved in water to create a 15% solution, and to this the previously measured liquid crystal composite material LC5 was added, and a surfactant was added. This solution was agitated and stirred to create a suspended solution. This solution was then coated on the substrates with electrodes, the water in the solution was caused to evaporate, and following this the opposing substrates with electrodes were stuck together. When this operation is conducted in a vacuum, air bubbles do not enter. In addition, it is fine to coat the liquid crystals on the substrates and then stick them together.

Figure 17:
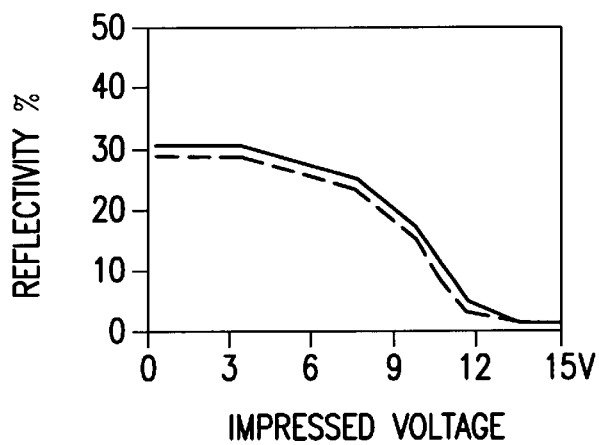
FIG. 17 is a drawing showing the electrooptical properties of the liquid crystal display devices of embodiments 35 and 36 of the present invention.

An electric field was impressed on the display device produced in this manner, and the electrooptical properties were measured (see the solid line in FIG. 17).

It is also possible to use the liquid crystal composite materials shown in Embodiment 3, Embodiment 5 and Embodiment 6. In addition, it would also be fine to insert chiral components into the liquid crystal.

By adding dichroic dyes to the liquid crystal, it is possible to create transparency under an impressed electric field and light absorption and light dispersion caused by the pigments when no electric field is impressed.

Embodiment 36

With the present embodiment, a liquid crystal display device was produced using the liquid crystal composite material LC2 of Embodiment 2 the same as in Embodiment 35, and the electrooptical properties were measured (see the dashed line in FIG. 17).

Embodiment 37

Figure 18:
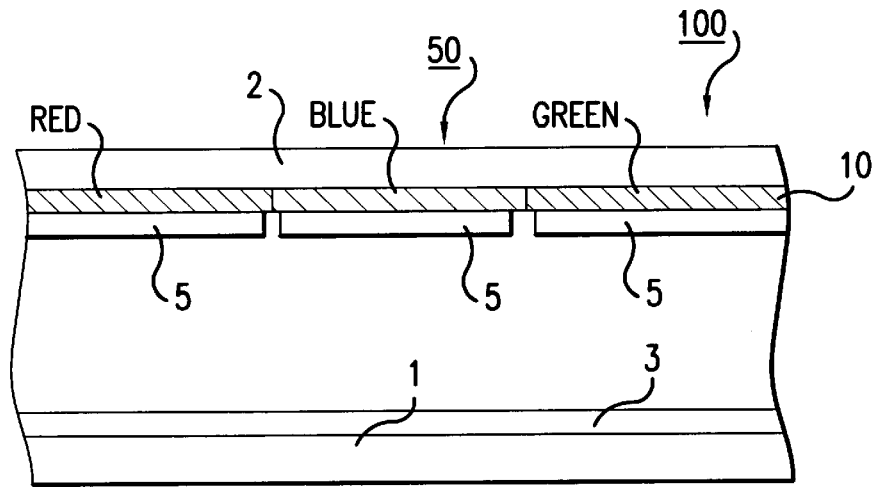
FIG. 18 is a schematic partial cross-sectional view of a liquid crystal display device in which the color filter 10 of embodiment 37 of the present invention is formed.

With the present embodiment, an example is shown in which each of the above-described embodiments is applied to a color liquid crystal display device using a color filter. In FIG. 18, a schematic partial cross-sectional view of the liquid crystal display device 100 in which a color filter 10 is formed and which uses the present embodiment is shown. For materials and production conditions other than the color filter 10, the various materials and conditions of each of the above-described embodiments were used. As the back side electrodes 5, reflective electrodes were used. In the present embodiment, no dichroic dyes were added, but is would also be fine to add dichroic dyes in order to increase the contrast. When a color display liquid crystal driver is connected to this color liquid crystal display device 100 and the device is used as a computer terminal, it was possible to conduct color displays with good contrast. Naturally, watches, television and game equipment displays are also possible.

For the composition and production methods of the empty panel, the layer composed of the liquid crystal and the polymer, and the chiral components used in the present embodiment, it is possible to use items composed as shown in Embodiments 1 through 35. In addition, application is also possible to the electronic devices shown hereafter.

As the color filter, a bright display is obtained when the color density is made thinner than the transmission-type color filter generally used. Furthermore, in addition to the three basic colors of red, blue and green, it is also possible to select freely combinations of colors for which color display is possible, such as yellow, cyan and magenta.

In addition, concerning the position where the color filter 10 is inserted, the color filter 10 was formed on the side of the substrate 2 on the display side of the liquid crystal display device 100 which side faces the liquid crystal, but it would also be fine to form the color filter 10 on the substrate 1. In addition, it is preferable from the aspect of drive voltage for the color filter 10 to be formed between the substrate and the electrodes 5, but it would also be fine to provide a transparent electrode on the substrate and then form the color filter on this transparent electrode.

When the color filter 10 is formed on the substrate 2, it is preferable to form the color filter 10 of a material that allows ultraviolet rays used to polymerize the polymer precursor to pass through.

Embodiment 38

Figure 19:
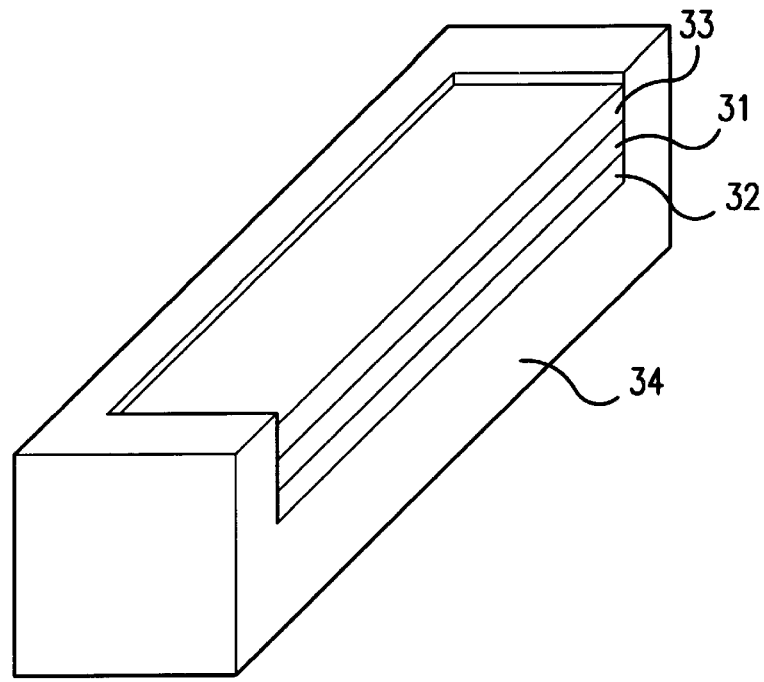
FIG. 19 is a schematic partial cross-sectional view of an information processing device of embodiment 38 of the present invention.

The present embodiment shows an embodiment wherein the liquid crystal display devices produced in the above-described embodiments are used in the display component of an electronic notebook which is an information processing device. In FIG. 19, a schematic partial cross-sectional view of the information processing device of the present embodiment is shown. The liquid crystal display device 31 is produced in accordance with each of the above-described embodiments, a solar cell 32 is placed on the back surface thereof, and the electrical output of this solar cell 32 is connected to and used as the power source of the electronic notebook. In the display device unit, a transparent electrode for an 8×100 simple matrix is formed as the electrode and is driven at $1/8$ duty. Electricity can be generated by the solar cell 32 through light which has passed through the liquid crystal display device 31, thereby greatly extending the usage period. For the display capacity, it is possible to double the display capacity by selecting simultaneously the liquid crystal display device 31 with two lines of common electrodes and inputting signals from the top and bottom of the segment electrode. In addition, it is possible to increase the display capacity by an integer multiple through similar methods.

The solar cell 32 is connected to a storage battery loaded in the electronic notebook and the electric power generated by the solar cell 32 can be stored in this storage battery, making it possible to adequately operate the device even in dark locations.

It would also be fine to place an information input device 33 such as a tablet or a touch panel on the front surface or back surface of this information processing device 34.

The present embodiment can also be used as a wrist computer shaped like a wristwatch. In this case, it is preferable to use a display device with a dichroic dye such as is shown in Embodiments 19 through 30 for the purpose of boosting display quality. It is possible to conduct simple matrix driving at an integer multiple of the eight lines of common electrodes. Naturally, static driving is also possible.

Embodiment 39

Figure 20:
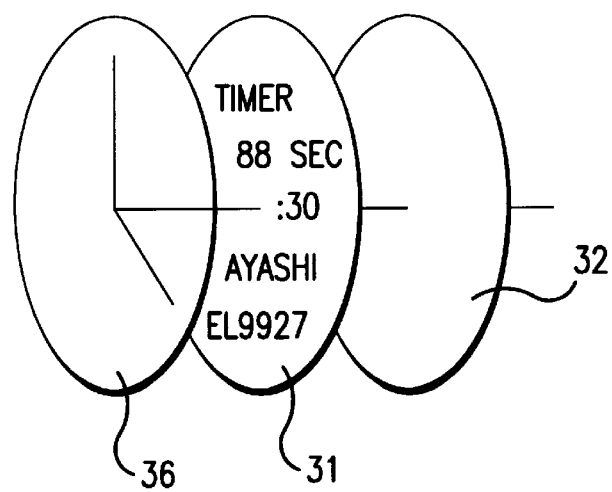
FIG. 20 is a schematic diagram of the clock of embodiment 39 of the present invention.

With the present embodiment, an example is shown in which the liquid crystal display device produced in each of the above-described embodiments is applied to a clock as an information display device. In particular, an example is shown using a liquid crystal display device in the dial. FIG. 20 shows the schematic cross-sectional view of the information display device of the present embodiment. A liquid crystal display device 31 with a hole in the center is produced in accordance with each of the above-described embodiments, a solar cell 32 is placed on the back surface thereof, and a needle is provided through the axis of an analog watch 36 to produce a hybrid wristwatch. In the display device unit, a transparent electrode for an 8×100 simple matrix is formed as the electrode and is driven at $1/8$ duty. Electricity can be generated by the solar cell 32 through light which has passed through the liquid crystal display device 31, thereby greatly extending the usage period. For the display capacity, it is possible to double the display capacity by selecting simultaneously the liquid crystal display device 31 with two lines of common electrodes and inputting signals from the top and bottom of the segment electrode. Naturally, static driving is also possible. It is also possible to increase the display capacity by an integer multiple through similar methods.

The solar cell 32 is connected to a storage battery loaded in the clock and the electric power generated by the solar cell 32 can be stored in this storage battery, making it possible to adequately operate the device even in dark locations.

In addition, when the liquid crystal display device 31 cannot be sufficiently driven by the voltage of the solar cell 32, a booster circuit can be added and the voltage of the solar cell 32 can be boosted to 5 V, thereby making it possible to obtain a very bright display.

In addition, as the driving method, it is possible to double the power source voltage in real terms by shaking the ground of the liquid crystal driver to match the drive timing. It is therefore possible to drive sufficiently the liquid crystal display device set forth in the present embodiment and to obtain a very bright display.

In the display device set forth in the present embodiment, the drive voltage is small. Although the power consumption is sufficiently small, it is possible to make the device such that a display is conducted on the liquid crystal display device 31 only when a switch is pressed in order to further lengthen the battery life when the device is used as a watch.

Naturally, it is also possible to conduct the display in a similar manner if a light-absorbing plate is provided in place of the solar cell 32.

Embodiment 40

Figure 21:
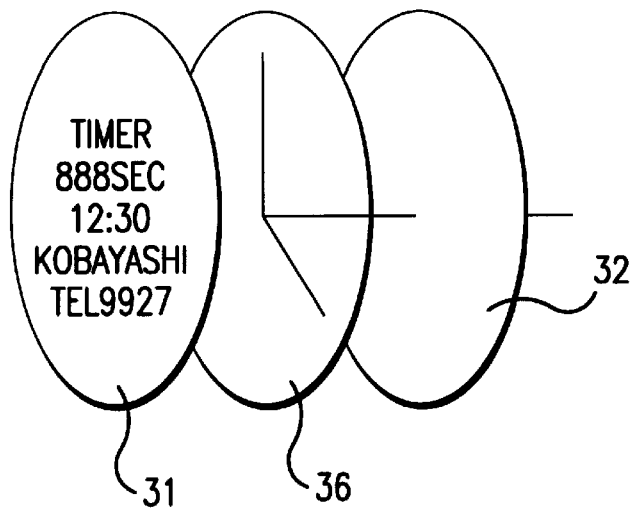
FIG. 21 is a schematic diagram of the clock of embodiment 40 of the present invention which uses the liquid crystal display device of the present invention in the cover glass.

With the present embodiment, an example is shown in which the liquid crystal display device produced in each of the above-described embodiments is applied to a clock as an information display device. In particular, an example is shown using the liquid crystal display device 31 in the cover glass of a watch (see FIG. 21). When a hybrid watch is produced with a liquid crystal display device 31 in accordance with each of the above-described embodiments, a solar cell 32 as the dial, and a needle through the axis of an analog watch 36, it is possible to conduct a display with a very high readability. It is also possible to use the device described in Embodiment 39 as-is in other compositions.

Embodiment 41

Figure 22:
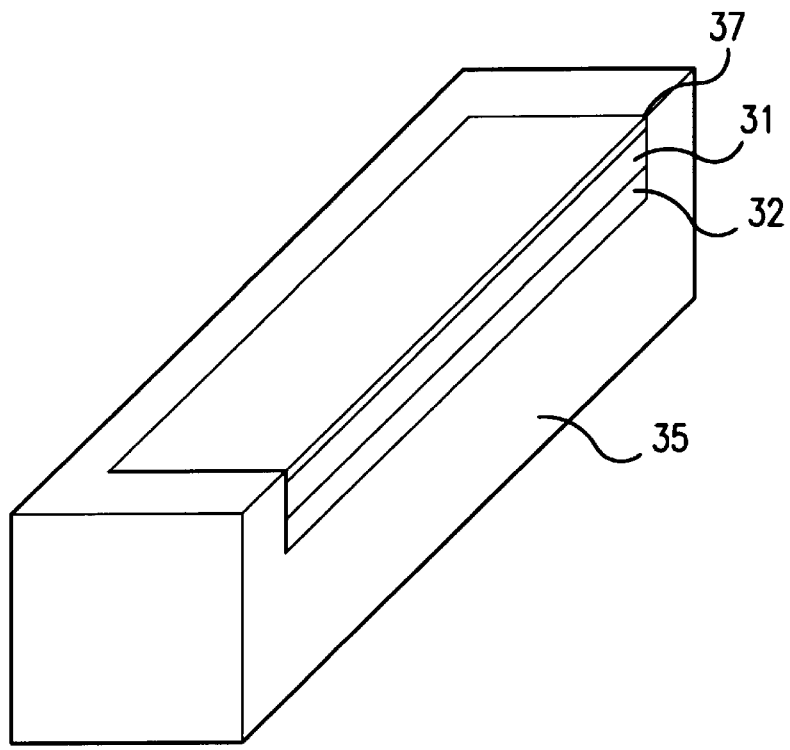
FIG. 22 is a schematic partial cross-sectional view showing the portable television of embodiment 41 of the present invention.

With the present embodiment, an example is shown wherein the liquid crystal display device produced in each of the above-described embodiments is applied to a portable television as an information display device 35 (see FIG. 22). The liquid crystal display device 31 is produced in accordance with each of the above-described embodiments, a solar cell 32 is placed on the back surface thereof, and this unit is assembled into the body of a portable television. The information display device has very high readability, while also greatly extending the usage time. In the present embodiment, a protective panel 37 is provided on the liquid crystal display device 31. It is also possible to use the device described in Embodiment 38 or 39 as-is in other compositions.

Embodiment 42

With the present embodiment, the method of composing the compounds of formula (7) is described.

Production of 4-methoxy-3'-fluoro-4"-cyanoterphenyl:

Procedure 1

7.7 grams of magnesium were inserted into a flask in a nitrogen atmosphere, and into this was dropped a solution in which 50 g of 4-methoxyphenylboric acid was dissolved in 280 ml of tetrahydrofuran. This mixture was then stirred for one night at room temperature, and a Grignard reagent was produced. Then, 100 g of triisopropyl borate was dissolved in 30 ml of tetrahydrofuran, and the Grignard reagent was dropped into this at room temperature. Following this, the mixture was stirred for one night at room temperature. When this was completed, 150 ml of 10% hydrochloric acid was added, and the mixture was stirred for one hour. Following extraction using chloroform, the mixture was washed three times with water and the chloroform was removed, yielding 19 g of 4-methoxyphenyl borate.

Procedure 2

67 g of aluminum chloride and 50.2 g of 4-bromo-2-fluorobiphenyl were dissolved in 200 ml of 1,1,2,2-tetrachloroethane, and the resulting product was cooled to lower than 0° C. Into this was dropped 19 g of acetyl chloride in which 100 ml of 1,1,2,2-tetrachloroethane was dissolved. Following this, the mixture was stirred for two hours at room temperature, and then stirred for an addition one hour at 50° C. When the reaction was complete, the reactive reaction liquid was poured into a solution containing 500 g of ice, 110 ml of water and 110 ml of concentrated hydrochloric acid. The product was then extracted using chloroform, washed three times with water, and the chloroform and 1,1,2,2-tetrachloroethane were removed. The residue underwent vacuum distillation (180–190° C./4 mm Hg) and was recrystallized from a mixed solution of acetone and methanol, to yield 44 g of 4-bromo-2-fluoro-4"-acetylbiphenyl.

Procedure 3

55 g of sodium hydroxide was dissolved in 300 ml of water, and into this 84 g of bromine were dropped at not greater than 5° C. Into this was added a solution containing 44 g of 4-bromo-2-fluoro-4"-acetylbiphenyl dissolved in 114 ml of 1,4-dioxane at not greater than 5° C. Following this, the mixture was stirred for one hour at 40° C. When the reaction was completed, the reactive fluid was poured into 230 ml of concentrated hydrochloric acid and 450 g of ice, and the precipitated crystals were filtered. The crystals were then washed in water, recrystallized from ethanol, and dried at 80° C. to yield 40 g of 4-(4"-bromo-2"-fluorophenyl) benzoic acid.

Procedure 4

The 40 g of 4-(4"-bromo-2"-fluorophenyl) benzoic acid was added to 30 ml of thionyl chloride, and refluxed for five hours. Following this, the thionyl chloride was removed, and the result was washed with hexane to yield 37 g of 4-(4"-bromo-2"-fluorophenyl) benzoyl chloride.

Procedure 5

The 37 g of 4-(4"-bromo-2"-fluorophenyl) benzoyl chloride was dissolved in 120 ml of 1,4-dioxane, and was stirred at not greater than 5° C. Into this was added a solution in which ammonia gas had been saturated in 250 ml of 1,4-dioxane. Following this, the mixture was stirred for one hour at not greater than 5° C. while ammonia gas was blown into the reactive fluid. The reactive fluid was then emptied into water, the precipitated crystals were filtered and washed. The crystals that were obtained were then dried to yield 32 g of 4-(4"-bromo-2"-fluorophenyl) benzamide.

Procedure 6

The 32 g of 4-(4"-bromo-2"-fluorophenyl) benzamide were added to 40 ml of thionyl chloride and the result was refluxed for five hours. Following this, the thionyl chloride was removed, water was added and the mixture was then extracted with chloroform. The product was then washed with water, washed with a 5% solution of potassium hydroxide, and then washed with water again to remove the chloroform. The residue was then recrystallized from a mixture of acetone and methanol to yield 20 g of 4-bromo-2-fluoro-4'-cyanobiphenyl.

Procedure 7

A solution of 7.6 g of 4-methoxyphenyl borate dissolved in 60 ml of ethanol was dropped at room temperature into a mixture containing 13 g of 4-bromo-2-fluoro-4'-cyanobiphenyl, 0.5 g of tetrakis (triphenylphosphine) palladium, 90 ml benzene and 70 ml of a 2M potassium carbonate aqueous solution. This was then refluxed for five hours and cooled to room temperature, the reaction liquid was extracted with chloroform and washed three times with water, and the chloroform was removed. The residue that was obtained underwent vacuum distillation, and then was recrystallized from acetone to yield 6.6 g of 4-methoxy-3'-fluoro-4"-cyanoterphenyl. This compound exhibited a nematic liquid crystal phase, with a C-N point of 126° C. and an N-I point of 247.3° C.

Using similar methods, the following compounds were produced.

4-ethoxy-3'-fluoro-4"-cyanoterphenyl C-N point 129.20° C., N-I point 260.0° C.
4-propoxy-3'-fluoro-4"-cyanoterphenyl
4-butoxy-3'-fluoro-4"-cyanoterphenyl
4-pentyloxy-3'-fluoro-4"-cyanoterphenyl
4-hexyloxy-3'-fluoro-4"-cyanoterphenyl
4-heptyloxy-3'-fluoro-4"-cyanoterphenyl
4-octyloxy-3'-fluoro-4"-cyanoterphenyl
4-nonyloxy-3'-fluoro-4"-cyanoterphenyl
4-decyloxy-3'-fluoro-4"-cyanoterphenyl Embodiment 43

With the present embodiment, a description is provided of a liquid crystal composite material containing the compounds of formula 7. Using the commercially available mixed liquid crystal ZLI-1565 (produced by Merck, N-I point 89.3° C.) as the base liquid crystal, liquid crystal composite materials La and Lb were produced which respectively contain the 4-pentyl-4"-cyanoterphenyl, which has the same skeleton as the compounds of formula (7) but is a compound in which the fluorine atom is not bonded to the side chain and which is generally used at present in order to boost the N-I point; and the 4-methoxy-3'-fluoro-4"-cyanoterphenyl which was produced in embodiment 42 and which is a compound of formula (7) of the present invention.

the glass substrates 41 and 42 are placed facing each other via a seal material 46, the liquid crystal composite materials La and Lb created in embodiment 43 are poured between the glass substrates 41 and 42, light-scattering plates 45 are attached on the outer surface of the substrates 41 and 42, and TN-type liquid crystal display cells LA (using liquid crystal composite material La) and LB (using liquid crystal composite material (Lb) are formed. Here, the cell gap is 8 μm.

For the liquid crystal display cells LA and LB thus created, the visual angle dependency (hereafter called α) and the steepness (hereafter called β) of the voltage-optical transmittance at 25° C., and the threshold voltage $V_{th}$ were measured use alternating current static driving. Here, α, β and $V_{th}$ are defined as follows.

$$\alpha = \frac{V_{10}(\theta = 80°, T = 25° C.)}{V_{10}(\theta = 50°, T = 25° C.)}$$

$$\beta = \frac{V_{10}(\theta = 80°, T = 25° C.)}{V_{90}(\theta = 80°, T = 25° C.)}$$

$$V_{th} = V10$$

Here,

θ: the incident light angle with respect to the liquid crystal display cell (with the normal direction from the panel taken to be 90°)

V10, V90: the voltage values when the optical transmittance is 100-. and 90%, respectively.

TABLE 7

| Composite Material | La | Lb |
|---|---|---|
| ZLI-1565 | 90% by weight | 90% by weight |
| C₅H₁₁—⟨phenyl⟩—⟨phenyl⟩—⟨phenyl⟩—CN | 10% by weight | |
| CH₃O—⟨phenyl⟩—⟨phenyl(F)⟩—⟨phenyl⟩—CN | | 10% by weight |

The N-I point and double refraction (Δn) of liquid crystal composite materials La and Lb were measured. The results were as shown below.

TABLE 8

| Composite Material | La | Lb |
|---|---|---|
| N-I point (° C.) | 101.3 | 100.4 |
| Δn | 0.146 | 0.143 |

Embodiment 44

With the present invention, a liquid crystal display device is described which uses a liquid crystal composite material containing the compounds of formula (7).

Figure 23:
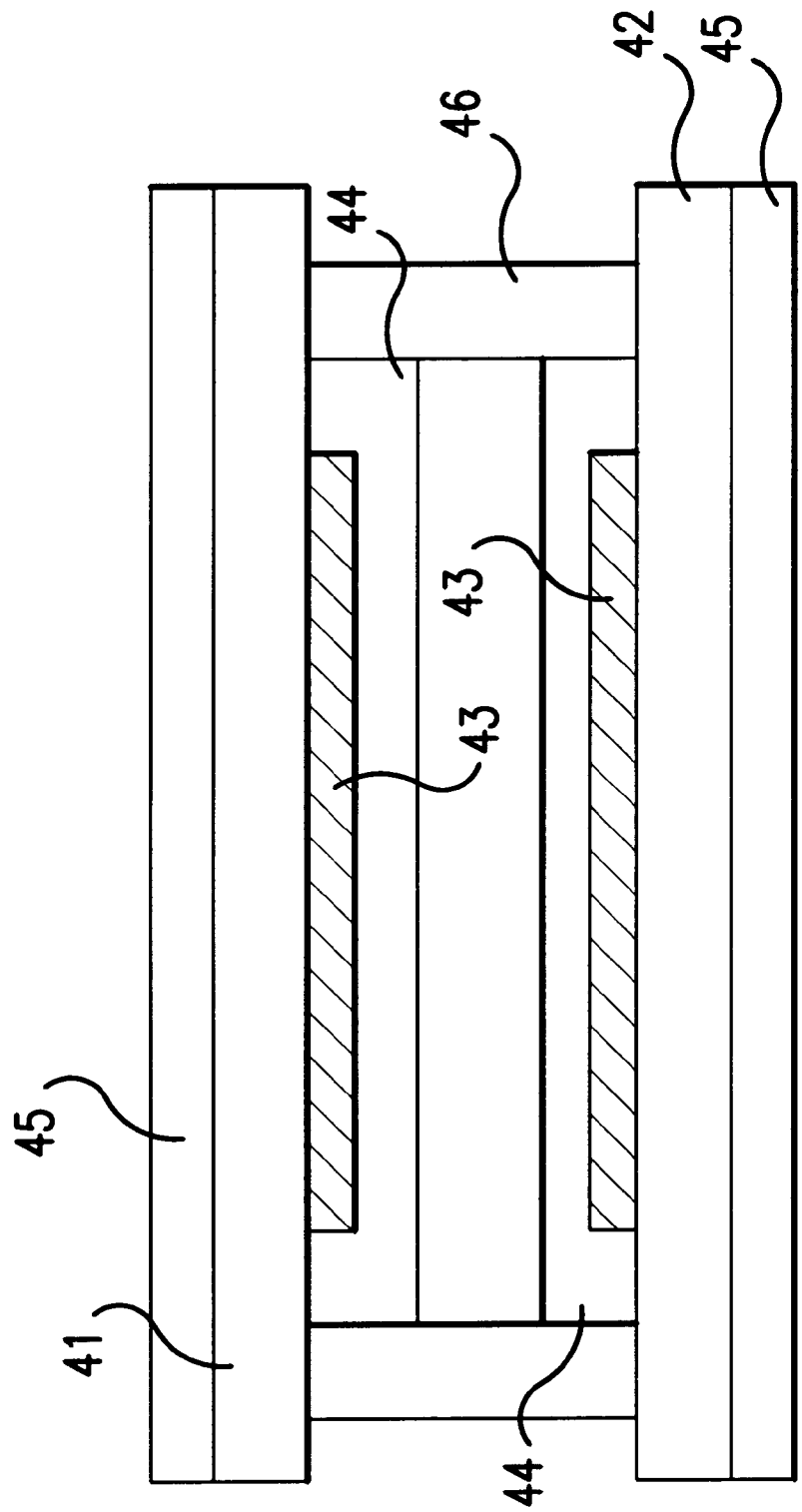
FIG. 23 is a cross-sectional view showing a liquid crystal display device formed in accordance with embodiments 44 and 45 of the present invention.

As shown in FIG. 23, electrodes 43 composed of transparent electrode film (for example, ITO film) are formed on the glass substrates 41 and 42, and orientation films composed of polyimides or the like are coated on top thereof. Next, orientation control layers 44 are formed by rubbing, The results of measurements were as follows:

TABLE 9

| Liquid Crystal Display | LA | LB |
|---|---|---|
| α | 1.292 | 1.336 |
| β | 1.425 | 1.498 |
| $V_{th}$ (V) | 2.415 | 2.338 |

In the above-described present embodiment, a TN-type liquid crystal display cell was used, but similar results could be obtained even if an STN-type display cell were used.

Embodiment 45

With the present embodiment, a PDLC liquid crystal display device is described which uses a liquid crystal composite material containing the compounds of formula (7).

Using the commercially available mixed liquid crystal TL202 (produced by Merck, N-I point 84.0° C.) as the base liquid crystal, liquid crystal composite materials Lc and Ld were prepared which respectively contain: 4-pentyl-4"-cyanoterphenyl which has the same skeleton as the compounds of formula (7), but which is a compound in which a fluorine atom is not bonded to the side chain and which is used at present in order to boost the N-I point; and the 4-methoxy-3'-fluoro-4"-cyanoterphenyl of embodiment 42 which is the compound of formula (7) of the present invention.

TABLE 10

| Composite Material | Lc | Ld |
|---|---|---|
| TL202 | 90% by weight | 90% by weight |
| C$_5$H$_{11}$—⬡—⬡—⬡—CN | 10% by weight | |
| CH$_3$O—⬡—⬡(F)—⬡—CN | | 10% by weight |

Into these liquid crystal composite materials Lc (N-I point 97° C.) and Ld (N-I point 95° C.) were mixed 0.8% chiral component R1011 (produced by Merck) and 7% biphenyl-4-y methacrylate. This mixture was inserted into an empty panel similar to the one in embodiment 44, the polymer precursor was polymerized under ultraviolet irradiation, and the liquid crystal and polymer were mutually separated. The measurements were taken at a temperature of 20° C. and a cell gap of 5 μm.

Figure 24:
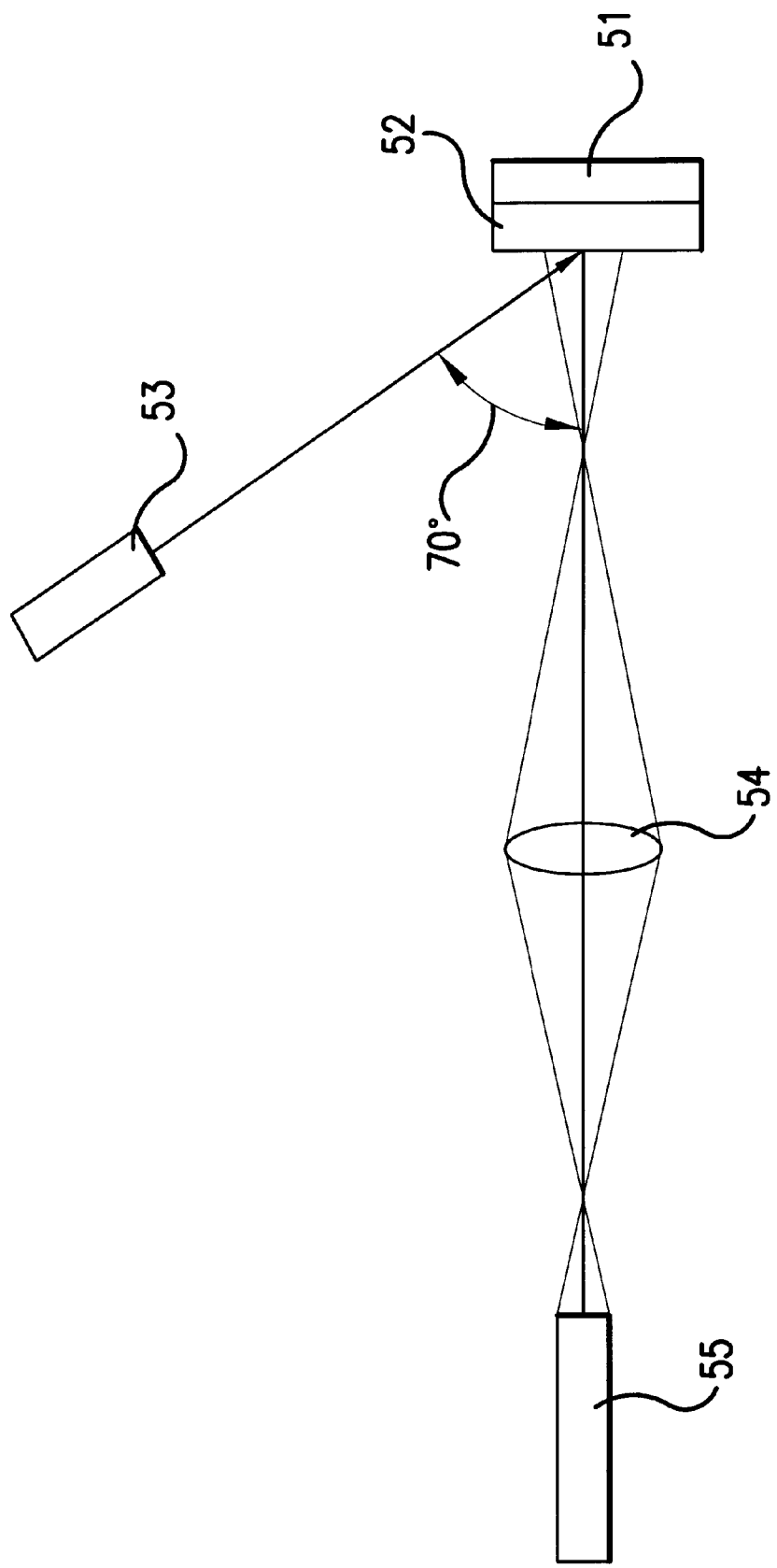
FIG. 24 is a drawing showing the optical system when the electrooptical properties of the liquid crystal display device in embodiments 44 and 45 of the present invention are measured.

The PDLC display devices LC (using liquid crystal composite material Lc) and LD (using liquid crystal composite material Ld) produced in this way were arranged in the optical system shown in FIG. 24, a signal was impressed in which the wave height was altered by a 1 kHz short wave, the reflectivity was measured while causing the voltage to change, and the minimum reflectivity, maximum reflectivity, threshold voltage (the voltage value when the wave height is altered 5% from the minimum reflectivity toward the maximum reflectivity, hereafter called V$_{th}$) and the saturation voltage (the voltage value when the wave height is altered 95% from the minimum reflectivity toward the maximum reflectivity, hereafter called V$_{sat}$) were measured.

For the reflectivity, the reflectivity when a high quality white paper was positioned in place of the device was taken to be 100%. As shown in FIG. 24, a reflective background plate 51 was provided on the back surface of the PDLC display device 52, light was incident on the PDLC display device 52 surface from a light source 53 in a direction inclined 70° from the normal, and the intensity of the light reflected in the normal direction was measured as the reflectivity using a photomultiplier tube 55 and an imaging lens 54. However, when a reflective electrode is used in the PDLC display device 52, it is not necessary to provide a reflective background plate 51. It has already been found for the reflectivity of the device that a visual angle dependency exists through rotation of the device so that the value of the reflectivity changes from the direction of incidence of the light even if the angle of incidence on the panel is kept constant. Accordingly, in order to match the measurement conditions, the reflectivities shown here use the values from when the panel was fixed at the angle of incidence giving the largest reflectivity. In this manner, the measurement results of the display device shown in the following table were obtained.

TABLE 11

| Liquid Crystal Display Cell | LC | LD |
|---|---|---|
| Minimum reflectivity (%) | 6.8 | 9.7 |
| Maximum reflectivity (%) | 123 | 126 |
| V$_{th}$ (V) | 7.5 | 6.1 |
| V$_{sat}$ (V) | 10.3 | 8.4 |

By thus using the compounds of formula (7), it is possible to greatly reduce the drive voltage of a TN device and a PDLC device. Moreover, other properties are the same as when conventional compounds are used.

Embodiments 46–48, 50–58 and 60–63

With the present embodiments, liquid crystal composite materials are described which contain the compounds of formula (5) and the compounds of formula (6).

The liquid crystal composite material (comparison examples) of embodiments 46 through 48 were prepared with the commercially available mixed liquid crystal TL202 (produced by Merck, N-I point 77° C.) as the base liquid crystal; the 4-pentyl-4"-cyanobiphenyl which has the same skeleton as the compounds of the present embodiments but does not have a fluorine atom bonded to the side chain, and which is generally used at present in order to boost the N-I point; and the 4-propyl-4"-cyano biphenyl generally used at present in order to lower the drive voltage. The liquid crystal composite materials of Embodiments 50 to 58 and 60 to 63 which are the liquid crystal composite materials of the present embodiment and which also use TL202 as the base liquid crystal were also prepared. The mixture ratios of the base liquid crystals and compounds used are as shown in Tables 12 and 13, and the respective composite materials are labeled a to c, e to m and o to r. The mixture ratios are given in percent by weight.

TABLE 12
| Embodiment<br>Composite Material Name | 46<br>a | 47<br>b | 48<br>c | 50<br>e | 51<br>f | 52<br>g | 53<br>h |
|---|---|---|---|---|---|---|---|
| TL202 | 90 | 85 | 85 | 90 | 85 | 90 | 85 |
| 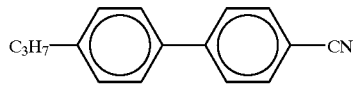 | 5 | 10 | 5 | | | | |
| 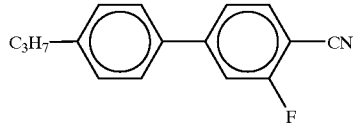 | | | | 5 | 10 | 5 | 10 |
| 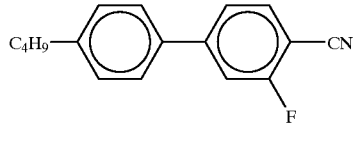 | | | | | | | |
| 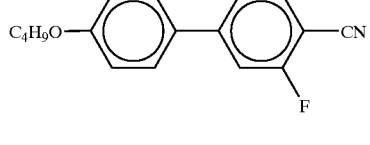 | | | | | | | |
| 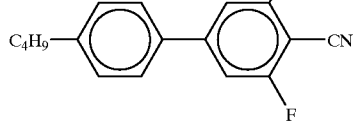 | | | | | | | |
| 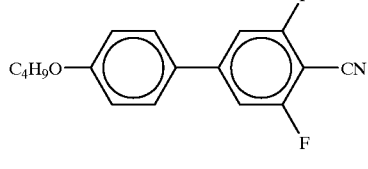 | | | | | | | |
| 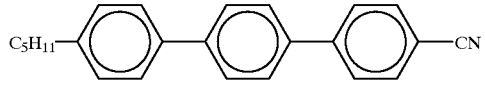 | 5 | 5 | 10 | | | | |
| 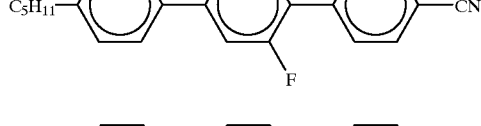 | | | | | | | |
| 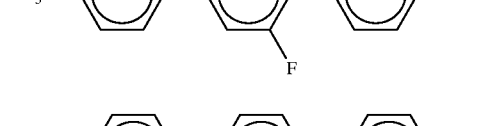 | | | | | | | |
| 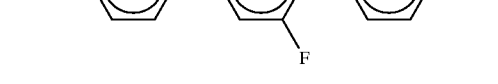 | | | | | | | |

TABLE 12-continued

| Embodiment | 46 | 47 | 48 | 50 | 51 | 52 | 53 |
|---|---|---|---|---|---|---|---|
| Composite Material Name | a | b | c | e | f | g | h |
| C₅H₁₁―⟨⟩―⟨⟩―⟨⟩(F)―CN | | | | | 5 | 5 | |
| C₅H₁₁―⟨⟩―⟨⟩―⟨⟩(F,F)―CN | | | | | | 5 | 5 |
| N-I point (° C.) | 89 | 87 | 77 | 86 | 78 | 80 | 72 |

The N-I points of composite materials a through r were measured, and the results are shown in Tables 12 and 13. Embodiments 64, 68–76, 78–82, 84–87, 89–92, 94–97, 99–102, 104–107 and 109–111

With the present embodiments, PDLC liquid crystal display devices are described which use the liquid crystal composite material of Embodiments 46 to 48, 50 to 58 and 60 to 63 containing the compounds of formulas (5) and (6).

Figure 25:
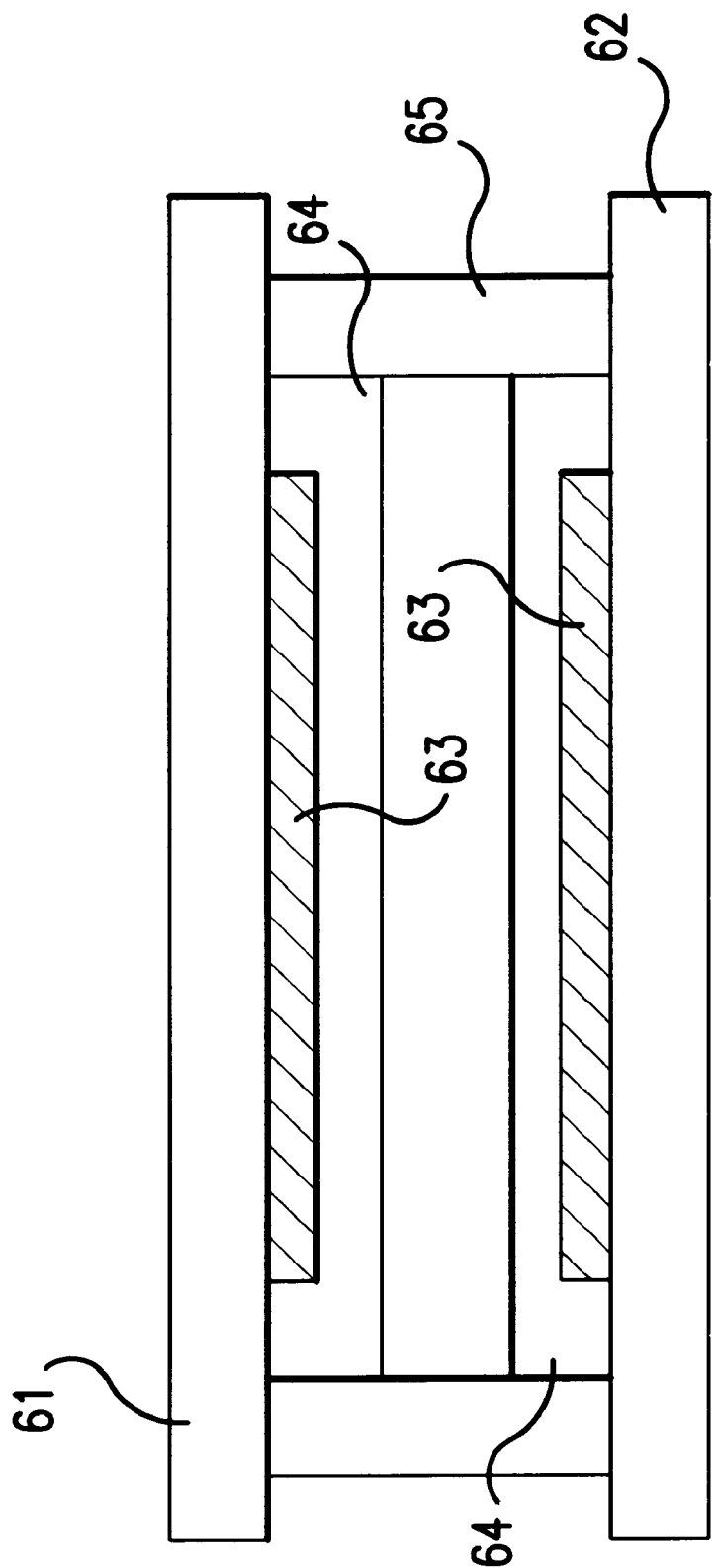
FIG. 25 is a drawing showing the liquid crystal display device formed in accordance with embodiments 64 through 111 of the present invention.

As shown in FIG. 25, electrodes 63 composed of transparent electrode film (for example, ITO film) are formed on the glass substrates 61 and 62, and orientation films composed of polyimides or the like are coated on the tops thereof. Next, orientation control layers 64 are formed by rubbing, and the glass substrates 61 and 62 are placed facing each other via a seal material 65 so that an empty panel is created.

Next, 0.8% of chiral component R1011 (produced by Merck) and the compounds of Tables 14 and 15, as polymer precursors, were mixed into the liquid crystal composite materials a to c, e to m and o to r prepared in Embodiments 46 to 48, 50 to 58 and 60 to 63. The composite materials, types of polymer precursors, and mixture ratios (ratios with respect to the composite materials) used in each of the embodiments are as shown in Tables 14 and 15. These composite materials are inserted into the above empty panel, and the liquid crystal and polymer are mutually separated by polymerizing the polymer precursor under ultraviolet irradiation. Here, the cell gap was 5 μm.

Figure 26:
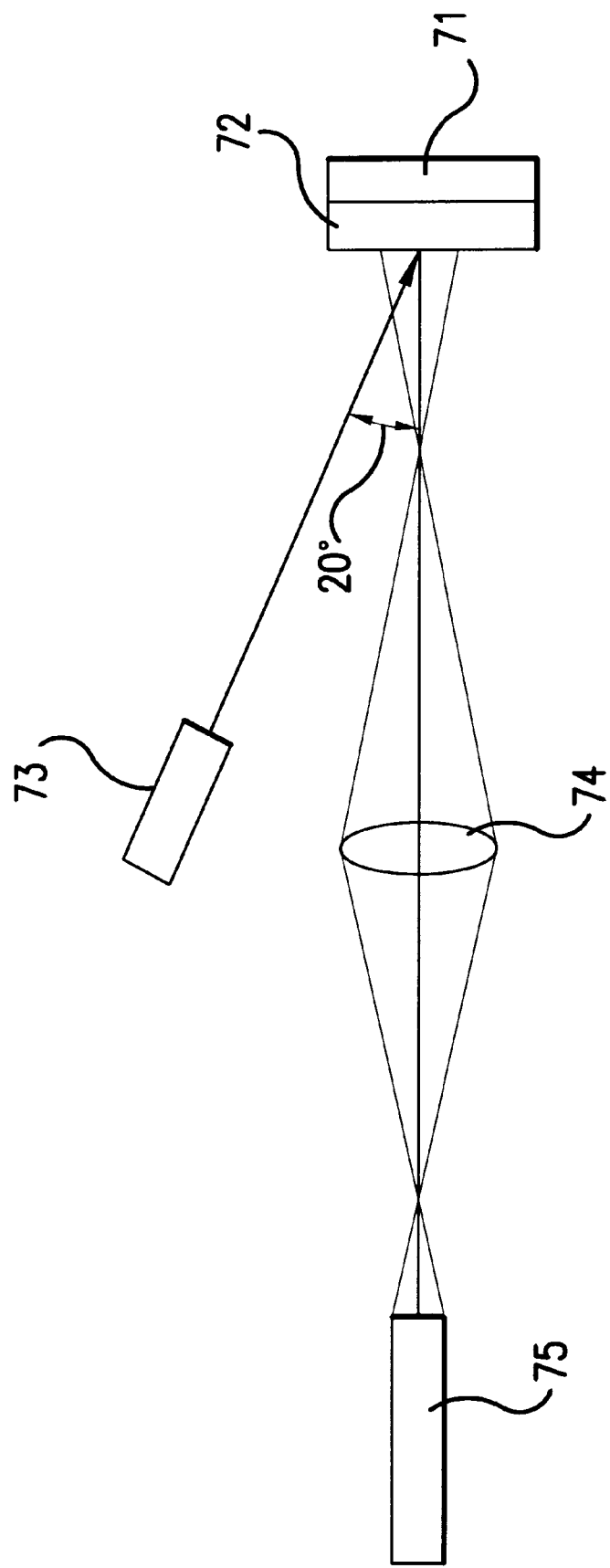
FIG. 26 is drawing showing the optical system when the electrooptical properties of the display device in embodiments 64 through 111 of the present invention are measured.

The PDLC display devices produced in this way were arranged in the optical system shown in FIG. 26. A signal was impressed in which the wave height was altered by a 1 kHz short wave, the reflectivity was measured while causing the voltage to change, the minimum reflectivity and maximum reflectivity were measured and following this the threshold voltage $V_{th}$ (the voltage value when the wave height was altered 5% from the minimum reflectivity toward the maximum reflectivity) was measured. As a result, the measurements shown in Tables 14 and 15 were obtained. As shown in FIG. 26, a reflective background plate 71 was provided on the back surface of the PDLC display device 72, light was incident on the PDLC display device 72 surface from a light source 73 in a direction inclined 20° from the normal, and the intensity of the light reflected in the normal direction was measured as the reflectivity using a photomultiplier tube 75 and an imaging lens 74. However, when a reflective electrode is used in the PDLC display device 72, it is not necessary to provide a reflective background plate 71.

For PDLC devices in which the liquid crystal composite material had an N-I point of 75° C. to 85° C., the $V_{th}$ was compared between conventional composite materials a and b and composite materials e, k, o and p of the present invention. Embodiments 64, 65, 82, 92 and 102 are the cases wherein composite materials a and b were used, while Embodiments 68, 74, 78, 79, 89, 99, and 109 are the cases wherein composite materials e, k, o and p were used. When these are compared with values using the same polymer precursor, Embodiment 74 is 0.5 to 0.9 V lower than Embodiments 64 and 65. In addition, when Embodiments 82 and 89 are compared, the latter was 0.2 V lower.

Next, for PDLC devices in which the liquid crystal composite material had an N-I point of 85° C. to 95° C., the $V_{th}$ was compared between conventional composite material c and composite materials i, j and m of the present invention were used were compared. Embodiment 66, is the case wherein composite material c was used, while Embodiments 72, 73, 76, 86, 96, and 106 are the cases wherein composite materials i, j and m were used. When these are compared with values using the same polymer precursor, Embodiments 72 and 73 are 0.1 to 0.4 V lower than Embodiment 66, and a comparison with Embodiment 76 showed this embodiment to be more than 1 V lower.

By thus using liquid crystal composite material containing the compounds of formula (5) and the compounds of formula (6), it is possible to greatly reduce the drive voltage of a PDLC device. Moreover, other properties are the same as when conventional compounds are used.

In the present invention, by using a liquid crystal composite material containing the compound represented by the general formula

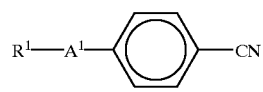

(1)

(in this formula, at least one hydrogen atom out of R¹, A¹, and the hydrogen atoms in the benzene ring is displaced by a halogen atom, R¹ represents an alkyl radical or an alkoxy radical, and A¹ is selected from a group comprising a benzene ring, a cyclohexane ring,

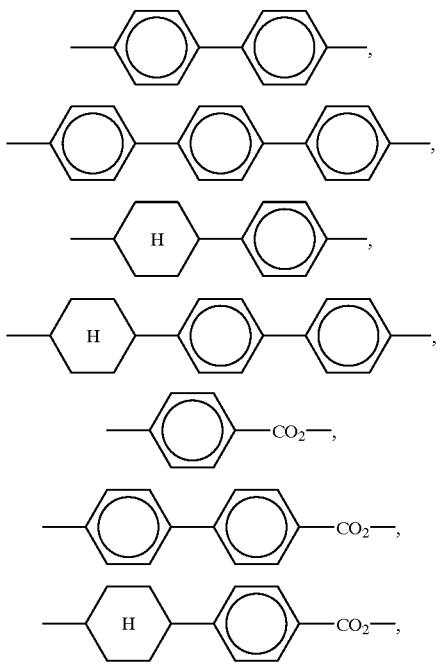

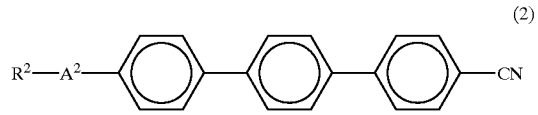

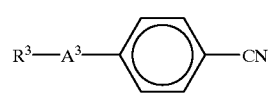

a pyridine ring and a pyrimidine ring), it is possible to lower the drive voltage of the liquid crystal display device. It is also possible to lower the drive voltage of a polymer-dispersion type of liquid crystal display device which uses this liquid crystal composite material.

Moreover, in the present invention, by using a liquid crystal composite material containing the compound represented by the general formula

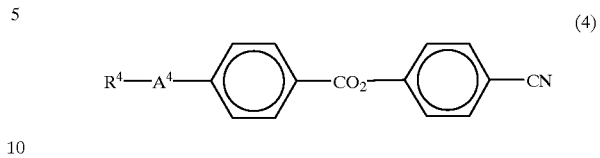

(in this formula, at least one of the hydrogen atoms is displaced by a fluorine atom, $R^2$ represents an alkyl radical or an alkoxy radical, and $A^2$ represents a cyclohexane ring or a benzene ring), it is possible to lower the drive voltage of the liquid crystal display device. It is also possible to lower the drive voltage of a polymer-dispersion type of liquid crystal display device which uses this liquid crystal composite material.

Moreover, in the present invention, by using a liquid crystal composite material containing the compound represented by the general formula $$R^3-A^3-\bigcirc-CN \qquad (3)$$

(in this formula, at least one of the hydrogen atoms is displaced by a fluorine atom, $R^3$ represents an alkyl radical or an alkoxy radical, and $A^3$ represents a pyridine ring, a pyrimidine ring, a cyclohexane ring or a benzene ring), it is possible to lower the drive voltage of the liquid crystal display device. It is also possible to lower the drive voltage of a polymer-dispersion type of liquid crystal display device which uses this liquid crystal composite material.

Moreover, in the present invention, by using a liquid crystal composite material containing compounds represented by the general formula $$R^4-A^4-\bigcirc-CO_2-\bigcirc-CN \qquad (4)$$

(in this formula, at least one of the hydrogen atoms is displaced by a fluorine atom, $R^4$ represents an alkyl radical or an alkoxy radical, and either $A^4$ does not exist and the $R^4$ radical is directly bonded to the benzene ring on the right side, or $A^4$ represents a cyclohexane ring or a benzene ring), it is possible to lower the drive voltage of the liquid crystal display device. It is also possible to lower the drive voltage of a polymer-dispersion type of liquid crystal display device which uses this liquid crystal composite material.

Moreover, in the present invention, by causing the compounds of formulas (2), (3) and (4) to be contained in the liquid crystal composite material, or by causing the compounds of formulas (2) and (4) to be contained in the liquid crystal composite material, it is possible to lower the drive voltage of the liquid crystal display device which uses this liquid crystal composite material. It is also possible to lower the drive voltage of a liquid crystal display device of polymer-dispersion type which uses this liquid crystal composite material. A liquid crystal composite material is obtained in which the nematic phase-isotropic phase transition point (N-I point) is high, the double refraction index is high, and the dependence of the double refraction index on temperature is small in the practical use temperature range. Thus, it is difficult for the display condition to be influenced by the practical use temperature.

Accordingly, if this liquid crystal composite material is used, a PDLC is obtained which has low drive voltage, fast response speed, is bright, has good contrast and in which the temperature dependence of these properties is small.

Furthermore, in the present invention, by using a liquid crystal composite material containing compounds represented by the general formula

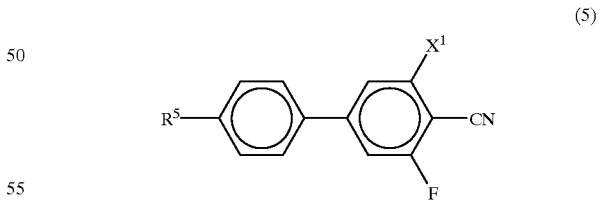

(in this formula, $R^5$ represents an alkoxy radical or a normal chain alkyl radical with 1–10 carbons, and $X^1$ represents a hydrogen atom or a fluorine atom), it is possible to obtain a liquid crystal display device or a polymer-dispersion type of liquid crystal display device having a low drive voltage and a wide practical use temperature range.

Furthermore, in the present invention, by using a liquid crystal composite material containing compounds represented by the general formula

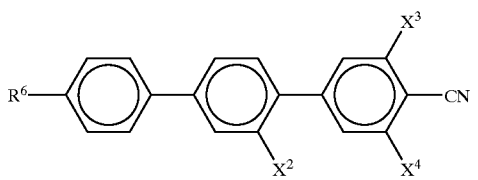

(6)

(in this formula, $R^6$ represents an alkoxy radical or a normal chain alkyl radical with 1–10 carbons, $X^2$, $X^3$, and $X^4$ all represent either hydrogen atoms or fluorine atoms, and at least one of $X^2$, $X^3$, and $X^4$ is a fluorine atom), it is possible to obtain a liquid crystal display device or a polymer-dispersion type of liquid crystal display device having a low drive voltage and a wide practical use temperature range.

Furthermore, in the present invention, by using a liquid crystal composite material containing both compounds of formulas (5) and (6) described above, it is possible to obtain a liquid crystal display device or a polymer-dispersion type of liquid crystal display device having a low drive voltage, a wide practical use temperature range, and superior properties.

Furthermore, in the present invention, by using a liquid crystal composite material containing compounds represented by the general formula

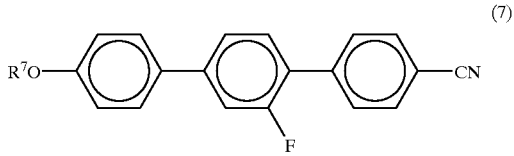

(7)

(in this formula, $R^7$ represents a normal chain alkyl radical with 1–10 carbons), it is possible to obtain a liquid crystal display device or a polymer-dispersion type of liquid crystal display device having a low drive voltage and a wide practical use temperature range.

In addition, a liquid crystal display device or polymer-dispersion type of liquid crystal display device using the liquid crystal composite materials of the present invention can be applied to a watch, and to the display units of vehicle instrument panels, meters on other equipment, household electronic products and electronic equipment. It is also possible to realize an analog display and a digital display in a single display window. Because there is absolutely no loss of quality in the analog display, these devices are ideal for applications which require class. Similar results can also be obtained when the present invention is applied to digital display devices (twisted nematic liquid crystal display devices, LEDS, VFDS, plasma displays or the like).

Furthermore, in the present invention, a ter phenyl derivative represented by the general formula

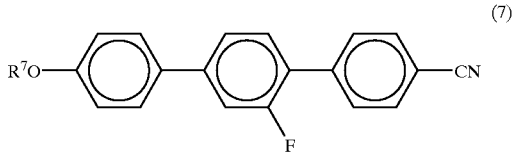

(7)

(in this formula, $R^7$ represents a normal chain alkyl radical with 1–10 carbons) is used favorably in a liquid crystal composite material, making it possible to provide a liquid crystal display device or a polymer-dispersion type of liquid crystal display device having a low drive voltage and a wide practical use temperature range.

What is claimed is:

1. A liquid crystal composite material comprised of at least one liquid crystal material and at least one compound represented by the general formula

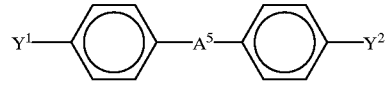

that is used as a polymer precursor, wherein $Y^1$ and $Y^2$ represent methacrylate groups, acrylate groups, hydrogen atoms, alkyl groups, alkoxy groups, fluorine atoms or cyano groups, and at least one of $Y^1$ and $Y^2$ represents either a methacrylate radical or an acrylate radical; and $A^5$ represents

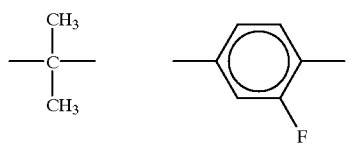

and the hydrogen atoms in the benzene rings on both sides of $A^5$ are all hydrogen atoms, or at least one of the hydrogen atoms is displaced by a halogen atom.

2. The liquid crystal composite material of claim 1, further comprising compounds represented by the general formula

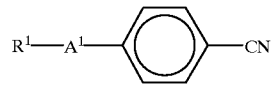

wherein at least one hydrogen atom out of $A^1$ and the hydrogen atoms in the benzene ring is displaced by a halogen atom, $R^1$ represents an alkyl radical or an alkoxy radical, and $A^1$ is selected from the group consisting of a benzene ring, a cyclohexane ring,

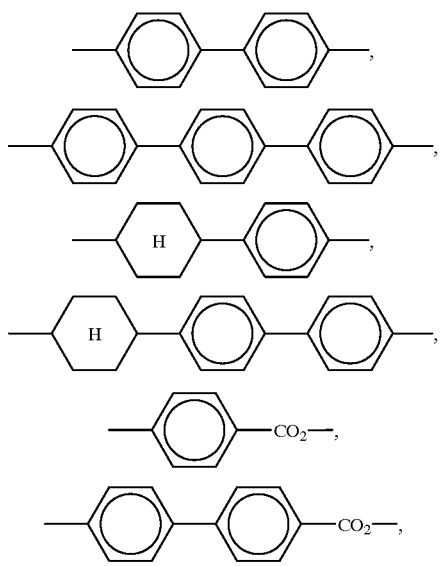

-continued

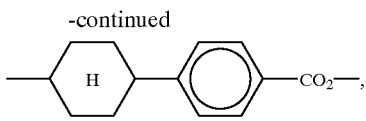

a pyridine ring and a pyrimidine ring.

3. The liquid crystal composite material of claim 1, further comprising compounds represented by the general formula

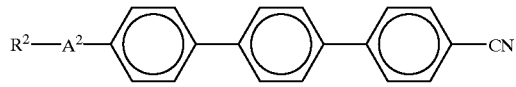

wherein at least one of the hydrogen atoms is displaced by a fluorine atom, $R^2$ represents an alkyl radical or an alkoxy radical, and $A^2$ represents a cyclohexane ring or a benzene ring.

4. The liquid crystal composite material of claim 1, further comprising compounds represented by the general formula

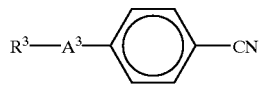

wherein at least one of the hydrogen atoms is displaced by a fluorine atom, $R^3$ represents an alkyl radical or an alkoxy radical, and $A^3$ represents a pyridine ring, a pyrimidine ring, a cyclohexane ring or a benzene ring.

5. The liquid crystal composite material of claim 1, further comprising compounds represented by the general formula

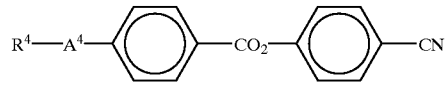

wherein at least one of hydrogen atoms is displaced by a fluorine atom, $R^4$ represents an alkyl radical or an alkoxy radical, and either $A^4$ does not exist and the $R^4$ radical is directly bonded to the benzene ring on the right side, or $A^4$ represents a cyclohexane ring or a benzene ring.

6. The liquid crystal composite material of claim 1, further comprising compounds represented by the general formula

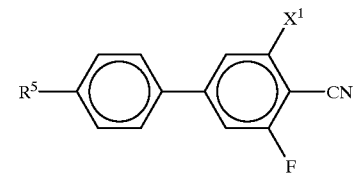

wherein $R^5$ represents an alkoxy radical or a normal chain alkyl radical with 1–10 carbons, and $X^1$ represents a hydrogen atom or a fluorine atom.

7. The liquid crystal composite material of claim 1, further comprising compounds represented by the general formula

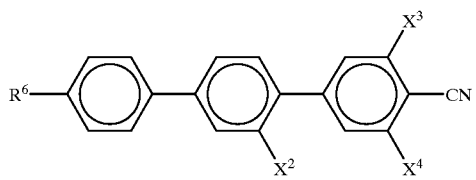

wherein $R^5$ represents an alkoxy radical or a normal chain alkyl radical with 1–10 carbons, $X^2$, $X^3$, and $X^4$ all represent either hydrogen atoms or fluorine atoms, and at least one of $X^2$, X3, and $X^4$ is a fluorine atom.

8. The liquid crystal composite material of claim 1, further comprising compounds represented by the general formula

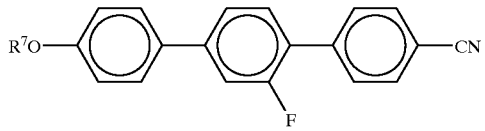

wherein $R^7$ represents a normal chain alkyl radical with 1–10 carbons.

9. A liquid crystal display device utilizing the liquid crystal composite material of claim 2.

TABLE 13

| Embodiment | 54 | 55 | 56 | 57 | 58 | 60 | 61 | 62 | 63 |
|---|---|---|---|---|---|---|---|---|---|
| Composite Material Name | i | j | k | l | m | o | p | q | r |
| TL202 | 85 | 80 | 90 | 85 | 85 | 90 | 85 | 90 | 94 |

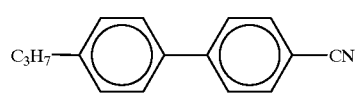

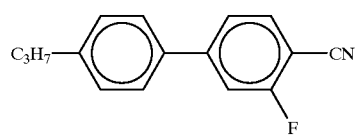

TABLE 13-continued

| Embodiment<br>Composite Material Name | 54<br>i | 55<br>j | 56<br>k | 57<br>l | 58<br>m | 60<br>o | 61<br>p | 62<br>q | 63<br>r |
|---|---|---|---|---|---|---|---|---|---|
| C$_4$H$_9$O–⟨⟩–⟨⟩(F)–CN |  |  | 5 | 10 |  |  |  |  |  |
| C$_4$H$_9$–⟨⟩–⟨⟩(F,F)–CN |  |  |  | 5 | 10 | 5 |  |  |  |
| C$_4$H$_9$O–⟨⟩–⟨⟩(F,F)–CN |  |  |  |  |  | 5 | 10 |  |  |
| C$_5$H$_{11}$–⟨⟩–⟨⟩–⟨⟩–CN |  |  |  |  |  |  |  |  |  |
| C$_5$H$_{11}$–⟨⟩–⟨⟩–⟨⟩(F)–CN | 10 | 10 |  |  |  |  | 5 | 5 |  |
| CH$_3$O–⟨⟩–⟨⟩–⟨⟩(F)–CN |  |  | 5 | 5 | 5 |  |  | 5 | 3 |
| C$_2$H$_5$O–⟨⟩–⟨⟩–⟨⟩(F)–CN |  |  |  |  | 5 |  |  | 5 | 3 |
| C$_5$H$_{11}$–⟨⟩–⟨⟩–⟨⟩(F)–CN |  |  |  |  |  |  |  |  |  |
| C$_5$H$_{11}$–⟨⟩–⟨⟩–⟨⟩(F,F)–CN |  |  |  |  |  |  |  |  |  |
| N-I point (° C.) | 89 | 87 | 77 | 70 | 86 | 80 | 76 | 94 | 87 |

TABLE 14a
| Embodiment | 64 | 65 | 66 | 68 | 69 | 70 | 71 |
|---|---|---|---|---|---|---|---|
| Composite Material Name | a | b | c | e | f | g | h |
| 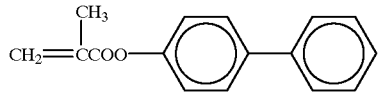 | 7 | 7 | 7 | 7 | 7 | 7 | 7 |
| 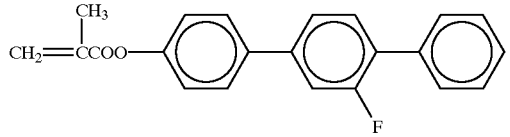 | | | | | | | |
| 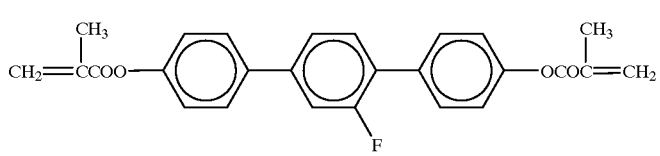 | | | | | | | |
| 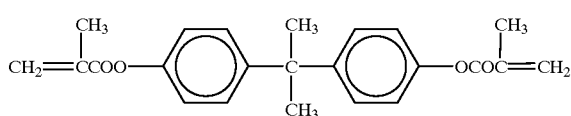 | | | | | | | |
| $V_{th}$ (V) | 6.3 | 5.9 | 6.9 | 6.0 | 5.7 | 5.8 | 5.5 |
TABLE 14b
| Embodiment | 72 | 73 | 74 | 75 | 76 | 78 | 79 | 80 | 81 |
|---|---|---|---|---|---|---|---|---|---|
| Composite Material Name | i | j | k | l | m | o | p | q | r |
| 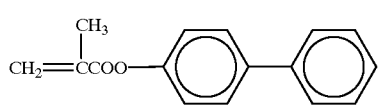 | 7 | 7 | 7 | 7 | 7 | 7 | 7 | 7 | 7 |
| 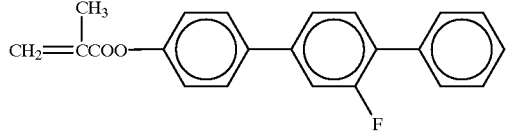 | | | | | | | | | |
| 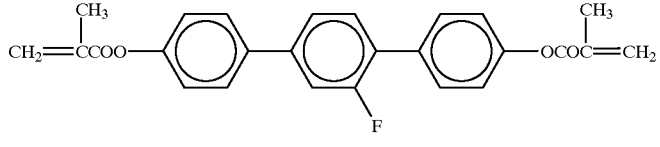 | | | | | | | | | |
| 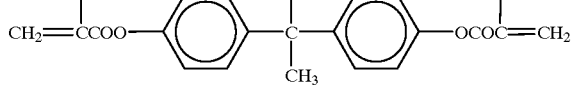 | | | | | | | | | |
| $V_{th}$ (V) | 6.5 | 6.6 | 5.4 | 4.9 | 5.6 | 5.9 | 5.7 | 6.1 | 5.9 |

TABLE 14c
| Embodiment | 82 | 84 | 85 | 86 | 87 | 89 | 90 | 91 |
|---|---|---|---|---|---|---|---|---|
| Composite Material Name | b | f | h | j | l | p | q | r |
| 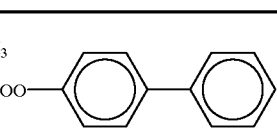 | | | | | | | | |
| 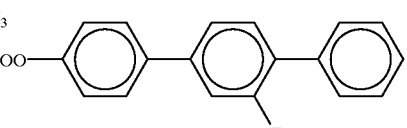 | 5 | 5 | 5 | 5 | 5 | 5 | 5 | 5 |
| 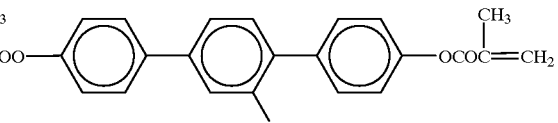 | | | | | | | | |
| 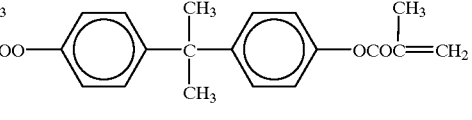 | | | | | | | | |
| $V_{th}$ (V) | 5.8 | 5.7 | 5.6 | 6.4 | 4.7 | 5.6 | 5.8 | 5.7 |
TABLE 15a
| Embodiment | 92 | 94 | 95 | 96 | 97 | 99 | 100 | 101 |
|---|---|---|---|---|---|---|---|---|
| Composite Material Name | b | f | h | j | l | p | q | r |
| | | | | | | | | |
| | 3.3 | 3.3 | 3.3 | 3.3 | 3.3 | 3.3 | 3.3 | 3.3 |
| | 1.7 | 1.7 | 1.7 | 1.7 | 1.7 | 1.7 | 1.7 | 1.7 |
| | | | | | | | | |
| $V_{th}$ (V) | 6.7 | 6.6 | 6.3 | 7.5 | 5.4 | 6.7 | 6.3 | 6.0 |

TABLE 15b

| Embodiment<br>Composite Material Name | 102<br>b | 104<br>f | 105<br>h | 106<br>j | 107<br>l | 109<br>p | 110<br>q | 111<br>r |
|---|---|---|---|---|---|---|---|---|
| 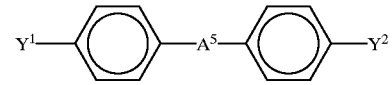 | 6.2 | 6.2 | 6.2 | 6.2 | 6.2 | 6.2 | 6.2 | 6.2 |
| 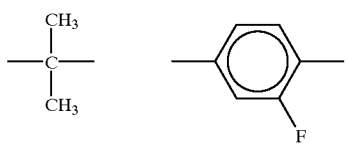 | 0.8 | 0.8 | 0.8 | 0.8 | 0.8 | 0.8 | 0.8 | 0.8 |
| $V_{th}$ (V) | 5.7 | 5.4 | 5.6 | 6.6 | 4.8 | 5.6 | 6.2 | 6.1 |

10. A liquid crystal composite material comprising at least one liquid crystal compound and at least one compound represented by the general formula

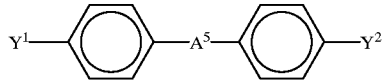

that is used as a polymer precursor, wherein $Y^1$ and $Y^2$ represent methacrylate groups, acrylate groups, hydrogen atoms, alkyl groups, alkoxy groups, fluorine atoms or cyano groups, and at least one of $Y^1$ and $Y^2$ represents either a methacrylate radical or an acrylate radical; and $A^5$ represents

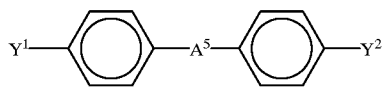

and the hydrogen atoms in the benzene rings on both sides of $A^5$ are all hydrogen atoms, or at least one of the hydrogen atoms is displaced by a halogen atom, wherein the polymer is dispersed in liquid crystal.

11. A liquid crystal apparatus, comprising a liquid crystal composite material comprising at least one liquid crystal compound and at least one compound represented by the general formula that is used as a polymer precursor, wherein $Y^1$ and $Y^2$ represent methacrylate groups, acrylate groups, hydrogen atoms, alkyl groups, alkoxy groups, fluorine atoms or cyano groups, and at least one of $Y^1$ and $Y^2$ represents either a methacrylate radical or an acrylate radical; and $A^5$ represents and the hydrogen atoms in the benzene rings on both sides of $A^5$ are all hydrogen atoms, or at least one of the hydrogen atoms is displaced by a halogen atom.

12. A liquid crystal apparatus, comprising a liquid crystal composite material comprising at least one liquid crystal component and at least one compound represented by the general formula that is used as a polymer precursor, wherein $Y^1$ and $Y^2$ represent methacrylate groups, acrylate groups, hydrogen atoms, alkyl groups, alkoxy groups, fluorine atoms or cyano groups, and at least one of $Y^1$ and $Y^2$ represents either a methacrylate radical or an acrylate radical; and $A^5$ represents

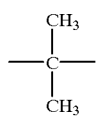 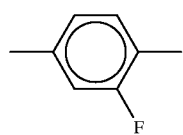
and the hydrogen atoms in the benzene rings on both sides of $A^5$ are all hydrogen atoms, or at least one of the hydrogen atoms is displaced by a halogen atom, wherein the polymer is dispersed in liquid crystal.
\* \* \* \* \*